(12) United States Patent
Nishimura

(10) Patent No.: US 9,774,775 B2
(45) Date of Patent: Sep. 26, 2017

(54) IMAGING APPARATUS

(71) Applicant: CANON KABUSHIKI KAISHA, Tokyo (JP)

(72) Inventor: Shinichi Nishimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/188,033

(22) Filed: Jun. 21, 2016

(65) Prior Publication Data
US 2017/0006198 A1    Jan. 5, 2017

(30) Foreign Application Priority Data
Jun. 30, 2015   (JP) ................................ 2015-131246

(51) Int. Cl.
| | | |
|---|---|---|
| *H04N 5/225* | (2006.01) | |
| *G02B 7/04* | (2006.01) | |
| *H02K 21/24* | (2006.01) | |
| *H02K 41/035* | (2006.01) | |

(52) U.S. Cl.
CPC ............ *H04N 5/2254* (2013.01); *G02B 7/04* (2013.01); *H02K 21/24* (2013.01); *H02K 41/0356* (2013.01)

(58) Field of Classification Search
CPC ........ G02B 7/04; G02B 27/646; G02B 27/64; H02K 21/24; H02K 41/0356; H04N 5/2254; H04N 5/23248; H04N 5/23251; H04N 5/23258; H04N 5/2328; G03B 2205/0007; G03B 2205/0023; G03B 2205/0038
USPC ................................................ 348/373, 374
See application file for complete search history.

(56) References Cited

U.S. PATENT DOCUMENTS

| | | | |
|---|---|---|---|
| 9,151,964 B2 * | 10/2015 | Takei ..................... | G02B 27/64 |
| 9,160,905 B2 | 10/2015 | Aoki | |
| 9,184,127 B2 | 11/2015 | Nishimura et al. | |
| 2009/0310959 A1 * | 12/2009 | Shih ........................ | G02B 7/08 |
| | | | 396/529 |
| 2011/0001835 A1 * | 1/2011 | Awazu .................... | G03B 5/00 |
| | | | 348/208.7 |
| 2012/0224840 A1 * | 9/2012 | Minamisawa ........... | G03B 5/00 |
| | | | 396/55 |

(Continued)

FOREIGN PATENT DOCUMENTS

JP    2014-060676 A    4/2014

*Primary Examiner* — Chia-Wei A Chen
(74) *Attorney, Agent, or Firm* — Fitzpatrick, Cella, Harper & Scinto

(57) ABSTRACT

An imaging apparatus includes a first magnetic core and a first coil wound around the first magnetic core, a second magnetic core and a second coil wound around the second magnetic core, an imaging element provided between the first coil and the second coil, and a magnetic member, wherein the magnetic member includes a first magnetic portion arranged between the first coil and one surface serving as a light-receiving surface side of the imaging element, a second magnetic portion arranged between the second coil and the other surface side opposite to the light-receiving surface side of the imaging element, and a third magnetic portion which connects the first magnetic portion and the second magnetic portion, and wherein the first magnetic portion is arranged so as to face the first magnetic core, and/or the second magnetic portion is arranged so as to face the second magnetic core.

10 Claims, 18 Drawing Sheets

(56) References Cited

U.S. PATENT DOCUMENTS

| | | | |
|---|---|---|---|
| 2013/0128360 A1* | 5/2013 | Minamisawa | G02B 27/646 359/554 |
| 2013/0163974 A1* | 6/2013 | Takei | G03B 5/00 396/55 |
| 2014/0055671 A1* | 2/2014 | Kawamura | H04N 5/2252 348/374 |
| 2014/0078350 A1* | 3/2014 | Aoki | H04N 5/2254 348/241 |
| 2015/0350577 A1 | 12/2015 | Nishimura | |
| 2016/0134813 A1* | 5/2016 | Hu | H04N 5/2254 348/208.11 |
| 2017/0094176 A1* | 3/2017 | Jung | H04N 5/23287 |

* cited by examiner

IMAGING APPARATUS

BACKGROUND OF THE INVENTION

Field of the Invention

The present invention relates to an imaging apparatus having an imaging element.

Description of the Related Art

According to an imaging element which is mounted in an imaging apparatus such as a digital video camera, digital still camera, or the like, in recent years, an ISO sensitivity has risen and, even in a scene of a small light amount such as a night scene, imaging with a clearer image can be performed. However, in association with the realization of the high sensitivity of the imaging element, such a problem that the imaging element is influenced by weak noises which did not cause a problem in the related art and a disturbance occurs in the image is actually caused.

For example, in the digital video camera, a motor for driving a lens is arranged in front of the imaging element such as a CMOS (Complementary Metal Oxide Semiconductor) image sensor or the like. Since a coil is provided for the lens driving motor, there is a case where a magnetic field generated from the coil exerts an influence on the imaging element and a disturbance occurs in the image which is formed by the imaging element.

In the related arts, with respect to a technique for suppressing such a situation that magnetic field noises generated from the coil are superimposed into the imaging element, Japanese Patent Application Laid-Open No. 2014-060676 discloses such a construction that a ferromagnetic member made of a ferromagnetic material having a high relative permeability such as Permalloy or the like is arranged between the coil and the imaging element. According to the construction disclosed in Japanese Patent Application Laid-Open No. 2014-060676, the ferromagnetic member becomes a detour of a magnetic flux to the imaging element and an arrival amount of the magnetic flux generated from the coil which arrives at the imaging element is reduced.

However, if the ferromagnetic member is arranged between the coil and the imaging element as disclosed in Japanese Patent Application Laid-Open No. 2014-060676, the ferromagnetic member also approaches inevitably the imaging element. The ferromagnetic member serving as a detour of the magnetic flux does not perfectly shut off the magnetic flux and a leakage of the magnetic flux exists in the neighborhood. Therefore, there is such a problem that if the ferromagnetic member approaches the imaging element, an amount of magnetic field which arrives at the imaging element increases.

According to such a construction that two coils are arranged so as to sandwich an imaging element, there is a case where a ferromagnetic member arranged between one of the coils and the imaging element also attracts magnetic field noises generated from the other coil. In such a case, there is such a problem that an amount of magnetic field which arrives at the imaging element cannot be sufficiently reduced.

SUMMARY OF THE INVENTION

It is an object of the present invention to provide an imaging apparatus in which even if a coil is arranged near an imaging element, an arrival amount of a magnetic field generated from the coil which arrives at the imaging element can be reduced.

According to an aspect of the present invention, there is provided an imaging apparatus including: a first magnetic core and a first coil wound around the first magnetic core; a second magnetic core and a second coil wound around the second magnetic core; an imaging element provided between the first coil and the second coil; and a magnetic member, wherein the magnetic member includes a first magnetic portion arranged between the first coil and one surface serving as a light-receiving surface side of the imaging element, a second magnetic portion arranged between the second coil and the other surface side opposite to the light-receiving surface side of the imaging element, and a third magnetic portion which connects the first magnetic portion and the second magnetic portion, and wherein the first magnetic portion is arranged so as to face the first magnetic core, and/or the second magnetic portion is arranged so as to face the second magnetic core.

Further features of the present invention will become apparent from the following description of exemplary embodiments with reference to the attached drawings.

DESCRIPTION OF THE EMBODIMENTS

Embodiments of the present invention will now be described in detail in accordance with the accompanying drawings.

First Embodiment

Figure 1:
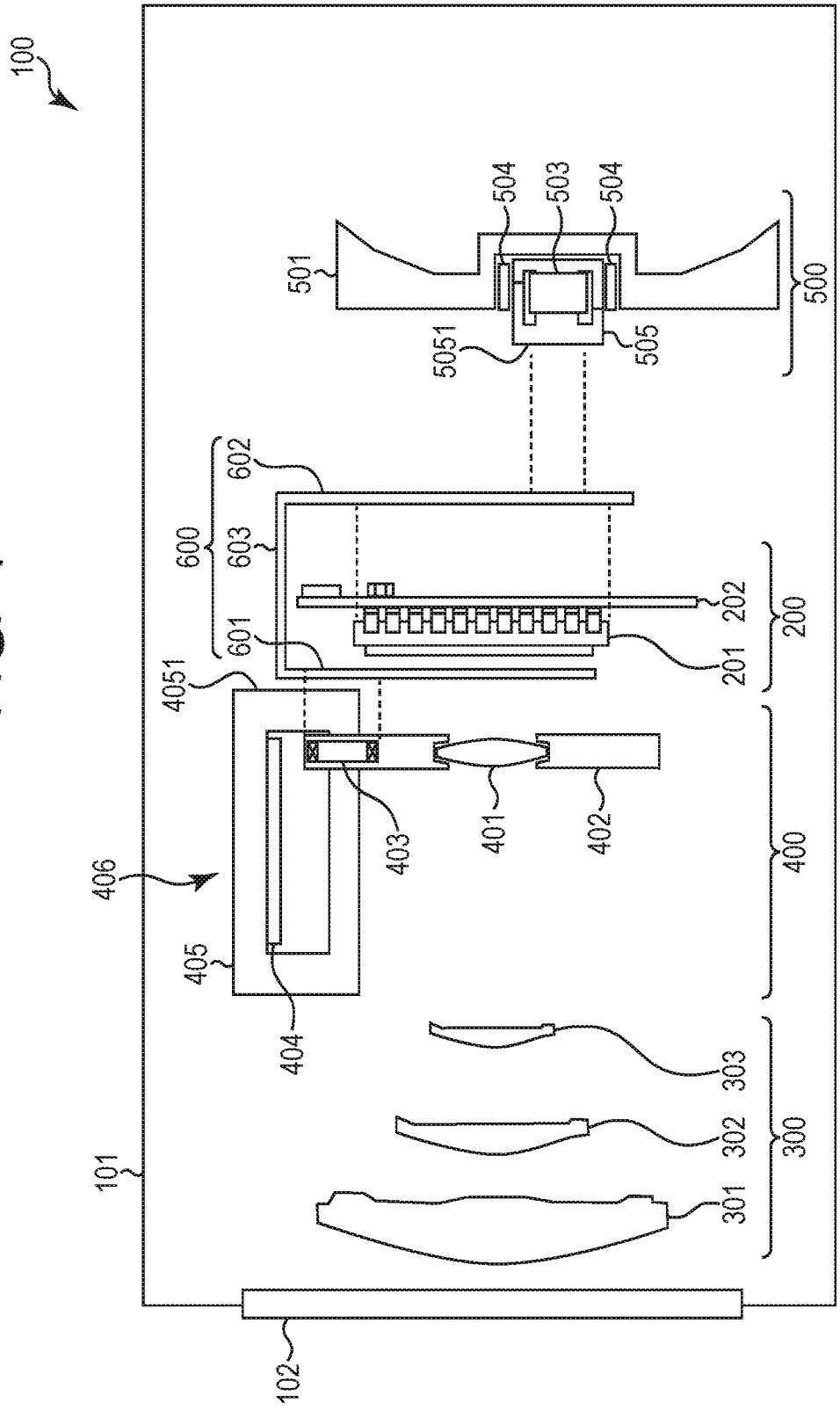
FIG. 1 is an explanatory diagram illustrating a schematic construction of an imaging apparatus according to the first embodiment of the present invention.

An imaging apparatus according to the first embodiment of the present invention will be described. FIG. 1 is an explanatory diagram illustrating a schematic construction of the imaging apparatus according to the present embodiment. An imaging apparatus 100 according to the present embodiment is a digital camera and, more specifically, for example, a digital video camera.

As illustrated in FIG. 1, the imaging apparatus 100 according to the present embodiment has a casing 101, an optical element (lens) group 300, a focus lens unit 400, an imaging unit 200, a cooling unit (cooling fan) 500, and a magnetic member 600. The magnetic member 600 has such a shape that a sheet-like or plate-like member has been bent.

In the casing 101, a window portion 102 provided with, for example, a lens cover or the like which can be automatically or manually opened or closed is formed in a front wall portion which faces an object. The optical element group 300, the focus lens unit 400, and the imaging unit 200 are arranged in the casing 101 in order from the front side toward the rear side. In the casing 101, the magnetic member 600 is arranged for the imaging unit 200 as will be described hereinafter. Further, in the casing 101, the cooling fan 500 is arranged behind the imaging unit 200.

The imaging unit 200 has an imaging element 201 and a printed circuit board 202. The imaging element 201 is, for example, a CMOS image sensor. The imaging element 201 is not limited to the CMOS image sensor but may be a CCD (Charge Coupled Device) image sensor or another image sensor. A driving circuit, a power supplying circuit, an A/D converting circuit, a communication interface circuit, and the like are mounted on the printed circuit board 202.

The imaging element 201 is provided in an IC (Integrated Circuit) package having a glass lid. The IC package in which the imaging element 201 has been provided is mounted on the printed circuit board 202, so that the imaging unit 200 is formed. The imaging unit 200 is arranged in such a manner that a board surface of the printed circuit board 202 is perpendicular in the front-rear direction of the casing 101. The imaging element 201 on the printed circuit board 202 is located on a focus lens 401 side and its light-receiving surface faces the focus lens 401 side.

The optical element group 300 has, for example, a plurality of lenses 301, 302, and 303 and includes a zoom lens. The optical element group 300 constructs an image forming optical system for forming an optical image of the object onto the light-receiving surface of the imaging element 201 together with the focus lens unit 400. A part of the casing 101 is a lens barrel in which the plurality of lenses 301, 302, and 303 and the focus lens unit 400 are enclosed.

The focus lens unit 400 arranged at the rear stage of the optical element group 300 has the focus lens 401, a lens holder 402, and a driving unit (voice coil motor) 406. The focus lens 401 is attached and fixed to the lens holder 402 so as to be located in front of the imaging element 201. The voice coil motor 406 drives the lens holder 402 to which the focus lens 401 has been attached. Specifically speaking, the lens holder 402 is driven by the voice coil motor 406 and the focus lens 401 is moved in parallel with the optical axis direction, thereby enabling the focus lens 401 to be in-focused to the object.

The voice coil motor 406 is of a linear driving type and has a coil 403, a permanent magnet 404, and a magnetic yoke 405. The coil 403 in the voice coil motor 406 is properly called a first coil 403. The magnetic yoke 405 has such a hollow square shape that it is formed in a hollow rectangular frame shape in which the front-rear direction of the casing 101 is set to the longitudinal direction. The magnetic yoke 405 functions as a magnetic core of the coil 403. The permanent magnet 404 is attached to the inside of the hollow portion of the magnetic yoke 405 and forms a DC (Direct Current) magnetic field (magnetostatic field) which is uniform in the upper-lower direction in a space of the hollow portion. The first coil 403 is wound around a lower longitudinal portion of the magnetic yoke 405 in such a manner that the first coil 403 can move along the lower longitudinal portion of the magnetic yoke 405 serving as its magnetic core in the front-rear direction. The first coil 403 may be wound around a bobbin through which the lower longitudinal portion of the magnetic yoke 405 has been inserted or may be wound around the lower longitudinal portion of the magnetic yoke 405 in a bobbinless manner. The lens holder 402 is fixed to the first coil 403 and the lens holder 402 is also moved in the front-rear direction by the movement in the front-rear direction of the first coil 403.

When the voice coil motor 406 is driven, a drive current is supplied to the first coil 403 as will be described hereinafter. When the drive current is supplied to the first coil 403, since the direction of the current perpendicularly crosses the uniform DC magnetic field in the space of the hollow portion of the magnetic yoke 405, a current force is generated in the optical axis parallel direction which perpendicularly crosses the current and the magnetic field by the Fleming's left-hand rule. By this current force, the first coil 403 and the lens holder 402 fixed to the first coil 403 slide along the optical axis direction serving as a front-rear direction of the casing 101. Since the lens holder 402 slides in this manner, the focus lens 401 moves in parallel along the optical axis direction, thereby enabling the lens to be in-focused to the object.

Upon imaging, light from the object enters the light-receiving surface of the imaging element 201 provided behind the optical element group 300 and the focus lens unit 400 through the optical element group 300 and the focus lens 401. The light which entered the light-receiving surface of the imaging element 201 is photoelectrically converted by photodiodes in a number of pixel circuits formed in a matrix form in the imaging element 201 and signal charges are accumulated as image signals. After that, the reading operation of the image signals is sequentially executed every row from the matrix-shaped pixel circuits. In the reading operation, first, the signal charges accumulated in the pixel circuits are transferred as voltage signals to column circuits in the imaging element 201. Then, the signal is amplified by a preamplifier at a predetermined gain. Further, the signal is transferred in the horizontal direction and is output to the outside of the imaging element 201 through a main amplifier. The image signal output to the outside is converted into a digital signal through the A/D converting circuit in the printed circuit board 202. Then, the signal is transferred to another printed circuit board (not shown) by the communication interface circuit and, after that, an image is constructed by the image signal processing circuit. The constructed image is stored into a memory and is displayed onto a liquid crystal screen or the like.

The cooling fan 500 arranged on the rear surface side opposite to the light-receiving surface of the imaging unit 200 is a fan to forcedly cool a heat generating portion in the casing 101. As a heat generating portion in the casing 101, for example, the imaging element 201 and the image signal processing circuit can be mentioned. When the cooling fan 500 rotates, the external air is taken from an inlet (not shown) formed in the casing 101. By the cooling fan 500, the air taken into the casing 101 is fed into a space where the heat generating portion such as an imaging element 201 and the like has been provided, passes in the space, and after that, is ejected to the outside from an outlet (not shown) formed in the casing 101. In this manner, the cooling fan 500 can eject the heat generated in the heat generating portion such as imaging element 201, image signal processing circuit, other circuits, and the like in the casing 101 to the outside of the casing 101. A flow of the air formed in the casing 101 by the cooling fan 500 is not limited to the foregoing flow but may be such a flow that the heat generated in the heat generating portion can be ejected to the outside of the casing 101.

In FIG. 1, the fan using a brushless DC motor is illustrated as an example of the cooling fan 500. The brushless DC motor used in the cooling fan 500 is of an outer rotor type and has a blade portion 501 as a rotor, a center coil 503 as a stator, and a magnetic core 505 serving as a core of the coil 503. The coil 503 in the cooling fan 500 is properly called a second coil 503.

The blade portion 501 is a rotor whose shaft along the optical axis is a rotation axis. A cylindrical concave portion into which the stator is inserted is provided at the center of the blade portion 501. An annular permanent magnet 504 charged so as to alternately show the opposite magnetic pole in order of S pole, N pole, . . . along the circumferential direction is attached to the inner peripheral wall surface of the concave portion of the blade portion 501. The magnetic core 505 serving as a core of the second coil 503 is formed in the central second coil 503 serving as a stator so as to have a plurality of gap portions at an outer circumference of the second coil 503. The second coil 503 is wound around the magnetic core 505 so as to have a cylindrical shape in which a rotational axis along the optical axis is set to the axis direction. The gap portions of the magnetic core 505 are periodically arranged in the circumferential direction of the second coil 503. When the direct current flows in the second coil 503, the directions of the magnetic fields generated in the gap portions become directions which are alternately inverted in the circumferential direction of the second coil 503. A magnetic field generated in the gap portion and a DC magnetic field (magnetostatic field) of the facing annular permanent magnet 504 are attracted and repel alternately, so that a rotational force of the motor is generated. The blade portion 501 is rotated by the rotational force generated in this manner, so that a flow of the air is formed.

The first coil 403 constructing the voice coil motor 406 and the second coil 503 constructing the cooling fan 500 are provided in the casing 101 of the imaging apparatus 100. A drive current is supplied to the first coil 403 when driving the voice coil motor 406. A drive current is supplied to the second coil 503 when driving the cooling fan 500. Since the drive current is supplied to both of the first coil 403 and the second coil 503 as will be described hereinafter, they become a magnetic field generating source for generating a leakage magnetic field.

First, the drive current which is supplied to the first coil 403 is, actually, a pulse current having such a waveform that an AC (Alternate Current) component is superimposed to a DC (Direct Current) component modulated by, for example, a PWM (Pulse Width Modulation) system. The pulse current can be controlled at a high speed. Even in the case of the pulse current, when considering a time-dependent average value, since the direct current flows, such a point that a current force adapted to cause the first coil 403 to slide is formed is guaranteed by the DC component. Since the AC component of the pulse current can be changed at a high speed, the position of the first coil 403 can be stably controlled at a high speed. On the other hand, the AC component of the current also forms an alternating magnetic field. The alternating magnetic field not only passes in the magnetic yoke 405 but also causes a large amount of magnetic field noises to be generated in the periphery as a leakage magnetic field. The higher a frequency of the alternating current is, an eddy current flows in the magnetic yoke 405 in such a direction as to cancel the magnetic field. Thus, an effective permeability of the magnetic yoke 405 decreases. Therefore, it is difficult that the magnetic field is concentrated only in the magnetic yoke 405, and thus a large amount of leakage magnetic field is generated in the circumference.

Actually, the drive current which is supplied to the second coil 503 in the cooling fan 500 has, for example, such a waveform that the AC component is superimposed to the DC component, and the pulse current according to a rotational speed and control of the cooling fan 500 is supplied. Even in the case of the pulse current, when considering a time-dependent average value, since the direct current flows, such a point that a rotational force adapted to rotate the blade portion 501 is formed by the DC component is guaranteed. Since the AC component of the pulse current can be changed at a high speed, the cooling fan 500 can be stably controlled at a high speed. On the other hand, the AC component of the current also forms an alternating magnetic field. The alternating magnetic field not only passes the magnetic core 505 but also causes a large amount of magnetic field noises to be generated in the periphery as a leakage magnetic field. The higher the frequency of the alternating current is, an eddy current flows in the magnetic core 505 in such a direction as to cancel the magnetic field. Thus, an effective permeability of the magnetic core 505 decreases. Therefore, it is difficult that the magnetic field is concentrated only in the magnetic core 505, and thus a large amount of leakage magnetic field is generated in the circumference. Since a component which leaks from a gap portion of the magnetic core 505 does not act on the DC magnetic field (magnetostatic field) of the permanent magnet 504, such a leakage component further leaks to the outside.

Since a drive sound of the cooling fan 500 is picked up by a microphone in the digital video camera, it is desirable that the drive sound is small as possible. For this purpose, such a construction that a large fan is used as a cooling fan 500 and the drive sound is reduced by rotating the large fan at a low speed is often used. In such a case, since a size of a DC motor to drive the large fan is also large and thus the leakage magnetic field itself also increases.

In this manner, the leakage magnetic field is generated from each of the two coils such as first coil 403 and second coil 503 arranged so as to sandwich the imaging element 201. There is a case where when the leakage magnetic fields arrive at the imaging element 201, a disturbance occurs in an image which is formed by the imaging element 201. There is also a case where when the leakage magnetic fields arrive at the printed circuit board 202 on which the imaging element 201 has been mounted, an influence occurs on the operation of the circuit on the printed circuit board 202. It is, therefore, necessary to reduce an arrival amount of the leakage magnetic field which arrives at the imaging element 201 and the printed circuit board 202.

Figure 2:
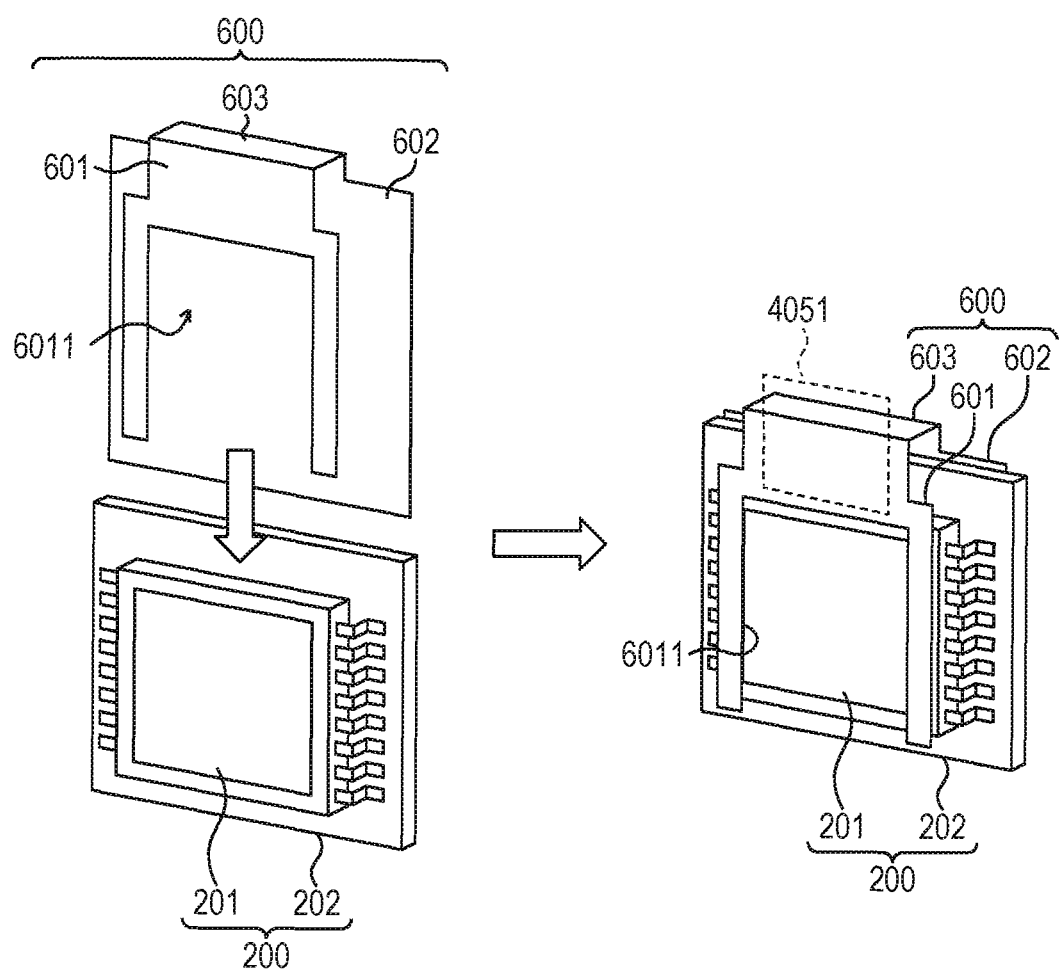
FIG. 2 is an explanatory diagram illustrating details of a magnetic member in the imaging apparatus according to the first embodiment of the present invention.

Therefore, in the imaging apparatus 100 according to the present embodiment, the magnetic member 600 is arranged for the imaging unit 200 having the imaging element 201 and the printed circuit board 202. The magnetic member 600 will be further described in detail with reference to FIG. 2. FIG. 2 is an explanatory diagram illustrating details of the magnetic member 600 in the imaging apparatus 100 according to the present embodiment.

As illustrated in FIG. 2, the magnetic member 600 includes a first magnetic portion 601 and a second magnetic portion 602 each serving as a sheet-like or plate-like portion and a third magnetic portion 603 which connects the first and second magnetic portions 601 and 602. As will be described hereinafter, an opening portion 6011 adapted to expose a pixel area of the imaging element 201 is formed in the second magnetic portion 602.

In FIG. 2, a diagram on the left side of an arrow illustrates a state before the magnetic member 600 is provided for the imaging unit 200 and a diagram on the right side of the arrow illustrates a state after the magnetic member 600 was provided for the imaging unit 200. Details of a material and a relative permeability of the magnetic member 600 will be described hereinafter.

The first magnetic portion 601 is arranged between the first coil 403 of the voice coil motor 406 and the side of the light-receiving surface serving as one side of the imaging element 201. The first magnetic portion 601 is arranged in such a manner that its sheet surface is substantially parallel with the light-receiving surface of the imaging element 201 and a board surface of the printed circuit board 202.

The first magnetic portion 601 is arranged in such a manner that its outer peripheral edge portion is located on the outer side than a pixel area of the imaging element 201. The opening portion 6011 adapted to expose the pixel area of the imaging element 201 is formed in the first magnetic portion 601 so that the light is transmitted from the focus lens 401 to the imaging element 201.

A plane shape of the first magnetic portion 601 is not particularly limited but can have various kinds of shapes. For example, as illustrated in FIG. 2, the first magnetic portion 601 can be constructed so as to have portions arranged along edge portions of three sides of the pixel area of the imaging element 201 exposed in the opening portion 6011. The first magnetic portion 601 can be constructed so as to have an annular portion arranged along edge portions of four sides of the pixel area of the imaging element 201 exposed in the opening portion 6011.

Further, the first magnetic portion 601 has a surface which faces a part or all of a surface 4051 of the magnetic yoke 405 of the first coil 403. The surface 4051 of the magnetic yoke 405 is a surface on the side of the first magnetic portion 601 in the magnetic yoke 405.

The second magnetic portion 602 is arranged between the second coil 503 of the cooling fan 500 and a rear surface side opposite to the light-receiving surface side of the imaging element 201. The second magnetic portion 602 is arranged in such a manner that its sheet surface is substantially parallel with the light-receiving surface of the imaging element 201 and the board surface of the printed circuit board 202.

The second magnetic portion 602 is formed so as to cover the whole surface of the rear surface side opposite to the light-receiving surface of the imaging element 201. That is, the second magnetic portion 602 has an area wider than an area of the region where the imaging element 201 has been projected in the optical axis direction. It is sufficient that the second magnetic portion 602 covers at least a part of the rear surface of the imaging element 201. Even in this case, an influence of the leakage magnetic field can be reduced. In order to sufficiently reduce also an influence of the leakage magnetic field on the printed circuit board 202, the second magnetic portion 602 may be formed so as to cover not only the rear surface of the imaging element 201 but also the whole surface of the rear surface of the circuit forming area in the printed circuit board 202.

The second magnetic portion 602 has a surface which faces a part or all of a surface 5051 of the magnetic core 505 of the second coil 503. The surface 5051 of the magnetic core 505 is a surface on the side of the second magnetic portion 602 in the magnetic core 505.

The first magnetic portion 601 and the second magnetic portion 602 are connected by the third magnetic portion 603 arranged so as to stride over the imaging unit 200. One edge portion of the third magnetic portion 603 is connected to an upper edge portion of the first magnetic portion 601. The other edge portion of the third magnetic portion 603 is connected to an upper edge portion of the second magnetic portion 602. It is not always necessary that the third magnetic portion 603 is connected to the upper edge portion of the first magnetic portion 601 and the upper edge portion of the second magnetic portion 602 but it is sufficient that the third magnetic portion 603 is connected to the first magnetic portion 601 and the second magnetic portion 602.

The first magnetic portion 601, second magnetic portion 602, and third magnetic portion 603 may be integratedly formed by the same sheet-like or plate-like members made of the magnetic members of the same material. The first magnetic portion 601, second magnetic portion 602, and third magnetic portion 603 may be formed by different sheet-like or plate-like members made of the magnetic members of the same or different materials, and they may be connected.

Specifically speaking, the sheet-like or plate-like magnetic member 600 may be formed in such a manner that the first magnetic portion 601, second magnetic portion 602, and third magnetic portion 603 are continuous by bending the same sheet-like or plate-like member made of the magnetic member of the same material. The sheet-like or plate-like magnetic member 600 may be formed by overlaying several parts made of the magnetic members of the same or different materials and connecting those parts. The sheet-like or plate-like magnetic member 600 may be formed as a composite member by combining different magnetic materials.

In the sheet-like or plate-like magnetic member 600, the member which covers the rear surface of the imaging element 201 is not limited to the second magnetic portion 602. It is sufficient to use such a construction that any portion including the first magnetic portion 601, second magnetic portion 602, and third magnetic portion 603 of the sheet-like or plate-like magnetic member 600 covers the rear surface of the imaging element 201.

Figure 3A:
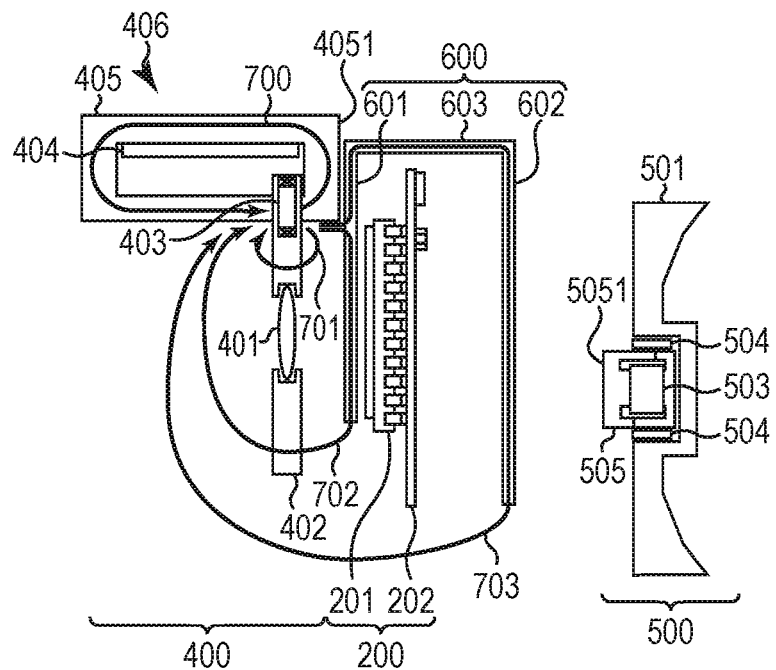
FIG. 3A is an explanatory diagram illustrating details of a main part of the imaging apparatus according to the first embodiment of the present invention and a leakage magnetic field which is generated from its coil.
Figure 3B:
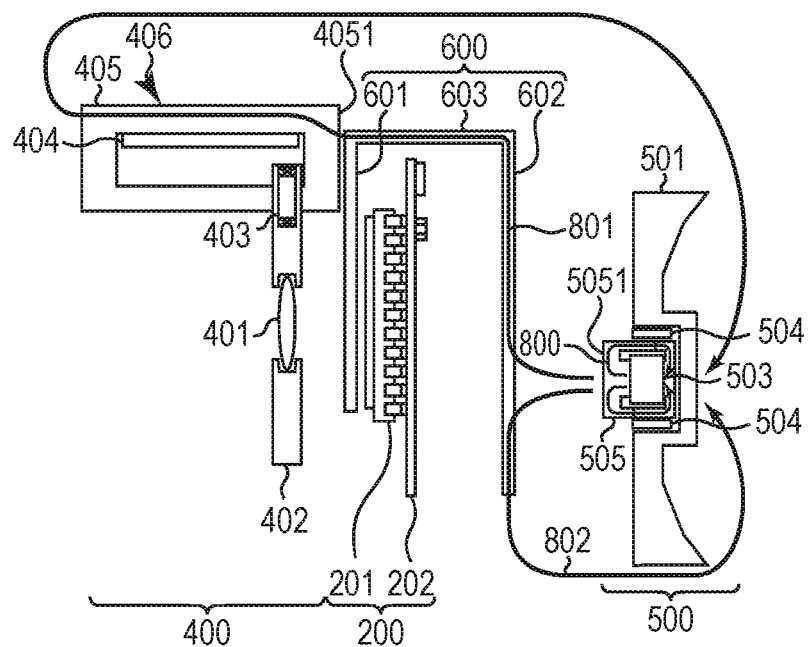
FIG. 3B is an explanatory diagram illustrating details of the main part of the imaging apparatus according to the first embodiment of the present invention and the leakage magnetic field which is generated from the coil.

In the imaging apparatus 100 according to the present embodiment, arrival amounts of the leakage magnetic field generated from the first coil 403 and the leakage magnetic field generated from the second coil 503 which arrive at the imaging element 201 and the printed circuit board 202 can be reduced by the foregoing sheet-like or plate-like magnetic member 600. The action of the present embodiment will be described hereinafter with reference to FIGS. 3A and 3B. FIGS. 3A and 3B are explanatory diagrams illustrating the leakage magnetic fields which are generated from the coils 403 and 503 in the imaging apparatus 100 according to the present embodiment.

FIG. 3A is an explanatory diagram illustrating the leakage magnetic field which is generated from the first coil 403 in the voice coil motor 406. In order to make the voice coil motor 406 for driving the focus lens 401 operative, the drive current containing the AC component flows in the first coil 403 as mentioned above. When the drive current flows in the first coil 403, as an alternating magnetic field caused by the AC component of the drive current, a magnetic field 700 is generated in the magnetic yoke 405 and a leakage magnetic field 701 is generated in a peripheral space of the first coil 403. Since a permeability of the first magnetic portion 601 arranged in front of the imaging element 201 is higher than that in the peripheral portion from a viewpoint of the magnetic circuit, the leakage magnetic field 701 generated from the coil 403 is attracted to the first magnetic portion 601.

The leakage magnetic field 701 attracted to the first magnetic portion 601 is branched to two different magnetic transfer routes 702 and 703. The magnetic transfer route 702 is a route which passes to the lower edge portion of the first magnetic portion 601. The magnetic transfer route 703 is a route which passes from the first magnetic portion 601 to the second magnetic portion 602 through the third magnetic portion 603. Since the leakage magnetic field 701 generated from the first coil 403 is bypassed to the magnetic transfer routes 702 and 703, the magnetic field which is branched to the imaging element 201 and the printed circuit board 202 provided between them can be reduced. As a result, the arrival amount of the leakage magnetic field 701 generated from the first coil 403 which arrives at the imaging element 201 and the printed circuit board 202 can be suppressed. Each of the magnetic fields transferred to the magnetic transfer routes 702 and 703 is finally propagated along a transfer route which passes through the lower space of the imaging element 201 and is returned to the first coil 403 to finally form a closed line of magnetic force.

The second magnetic portion 602 faces the magnetic core 505. Therefore, although not illustrated in FIG. 3A, a route which starts from the portion which faces the magnetic core 505 of the second magnetic portion 602, passes the magnetic core 505 of the second coil 503, and is returned to the first coil 403 can be also formed as a magnetic transfer route. This is because the magnetic field which is propagated along the magnetic transfer route 703 is space-propagated toward the surface 5051 of the magnetic core 505 which the second magnetic portion 602 faces. That is, it can be considered that the second magnetic portion 602 and the surface 5051 of the magnetic core 505 face and form a coupling magnetic circuit. Therefore, the leakage magnetic field generated from the coil 403 is propagated to the magnetic core 505 of the second coil 503 arranged on the side opposite to the imaging element 201. Thus, the magnetic field which arrives at the imaging element 201 side is reduced by an amount of the magnetic field which is propagated to the magnetic core 505. At a position which is sufficiently away from the imaging element 201, the leakage magnetic field propagated to the magnetic core 505 is transferred from the magnetic core 505 to an external space, is transferred along a transfer route which is returned to the first coil 403 to finally form a closed line of magnetic force.

As mentioned above, in the present embodiment, the leakage magnetic field 701 generated from the first coil 403 in the voice coil motor 406 avoids the imaging element 201 and the printed circuit board 202 and is bypassed to the magnetic transfer route 702 formed in the first magnetic portion 601. In the present embodiment, the leakage magnetic field 701 generated from the first coil 403 avoids the imaging element 201 and the printed circuit board 202 and is bypassed to the magnetic transfer route 703 formed in the first magnetic portion 601, third magnetic portion 603, and second magnetic portion 602. Thus, in the present embodiment, even if the first coil 403 is arranged near the imaging element 201, the arrival amount of the leakage magnetic field 701 generated from the first coil 403 which arrives at the imaging element 201 and the printed circuit board 202 can be reduced.

On the other hand, FIG. 3B is an explanatory diagram illustrating the leakage magnetic field which is generated from the second coil 503 in the cooling fan 500. In order to make the cooling fan 500 operative, the drive current containing the AC component flows in the second coil 503 as mentioned above. The AC component of the drive current which flows in the second coil 503 in the cooling fan 500 may have a frequency which is different from or is equal to that of the AC component of the current flowing in the first coil 403 in the voice coil motor 406. When the drive current flows in the second coil 503, as an alternating magnetic field caused by the AC component of the drive current, a magnetic field 800 occurs in the magnetic core 505 and a leakage magnetic field is generated in a peripheral space of the second coil 503. Since a permeability of the second magnetic portion 602 arranged behind the imaging element 201 is higher than that in the peripheral portion from a viewpoint of the magnetic circuit, the leakage magnetic field generated from the second coil 503 is attracted to the second magnetic portion 602.

The leakage magnetic field attracted to the second magnetic portion 602 is branched to two different magnetic transfer routes 801 and 802. The magnetic transfer route 802 is a route which passes to the lower edge portion of the second magnetic portion 602. The magnetic transfer route 801 is a route which starts from the second magnetic portion 602 and passes the first magnetic portion 601 through the third magnetic portion 603. The leakage magnetic field transferred to the magnetic transfer route 802 is transferred along a transfer route which passes through the space on the side opposite to the imaging element 201 and is returned to the second coil 503 to form a closed line of magnetic force.

The magnetic transfer route 801 further starts from the first magnetic portion 601 and passes the magnetic yoke 405 of the first coil 403. This is because the magnetic field which is propagated in the magnetic transfer route 801 is space-propagated toward the surface 4051 of the magnetic yoke 405 which the first magnetic portion 601 faces. That is, it can be considered that the first magnetic portion 601 and the surface 4051 of the magnetic yoke 405 face and form a coupling magnetic circuit. Therefore, the leakage magnetic field generated from the second coil 503 is propagated to the magnetic yoke 405 of the first coil 403 arranged on the side opposite to the imaging element 201. Thus, the magnetic field which arrives at the imaging element 201 side is reduced by an amount of the magnetic field which is propagated to the magnetic yoke 405. At a position which is sufficiently away from the imaging element 201, the leakage magnetic field propagated to the magnetic yoke 405 is transferred from the magnetic yoke 405 to an external space, is transferred along a transfer route which is returned to the second coil 503 to finally form a closed line of magnetic force.

As mentioned above, in the present embodiment, the leakage magnetic field generated from the second coil 503 in the cooling fan 500 avoids the imaging element 201 and the printed circuit board 202 and is bypassed to the magnetic transfer route 802 formed in the second magnetic portion 602. In the present embodiment, the leakage magnetic field generated from the second coil 503 avoids the imaging element 201 and the printed circuit board 202 and is bypassed to the magnetic transfer route 801 formed in the second magnetic portion 602, third magnetic portion 603, and first magnetic portion 601. The magnetic transfer route 801 is further formed to the magnetic yoke 405 of the first coil 403. Thus, in the present embodiment, even if the second coil 503 is arranged near the imaging element 201, the arrival amount of the leakage magnetic field generated from the second coil 503 which arrives at the imaging element 201 and the printed circuit board 202 can be reduced.

As mentioned above, in the present embodiment, the arrival amounts of the leakage magnetic fields generated from the two coils arranged so as to sandwich the imaging element 201 and the printed circuit board 202 which arrive at the imaging element 201 and the printed circuit board 202 can be reduced.

Subsequently, in the present embodiment, such an effect that the arrival amount of the magnetic field which arrives at the imaging element 201 can be reduced by the layout of the sheet-like or plate-like magnetic member 600 will be described in detail on the basis of Examples.

Example 1

Details of Example 1 will be described with reference to FIG. 2. In Example 1, the imaging element 201 of 7.5 mm×8.0 mm having a pixel area of 3.96 mm×5.28 mm is mounted on a ceramic lead package of 12.6 mm (in the vertical direction)×14.0 mm (in the lateral direction)×2.0 mm (thickness) by wire bonding. Such a semiconductor package is mounted, as a printed circuit board 202, on a rigid flexible board having a rigid portion of about 25 mm×27 mm so as to sandwich a copper sheet for radiation of 1.0 mm (thickness).

The voice coil motor 406 is provided in such a manner that the surface 4051 (which faces the first magnetic portion 601) of the magnetic yoke 405 having a hollow square shape is located at the position which is away from the surface of the imaging element 201 by 2.1 mm. Outer dimensions of the magnetic yoke 405 are equal to 5 mm (height) (a height of the hollow portion is equal to 3 mm), 5 mm (width), and 18.5 mm (length in the optical axis direction). A material of the magnetic yoke 405 is an SPCC material as a cold-rolled steel. The permanent magnet 404 of 5 mm (width) and 15 mm (length in the optical axis direction) is provided in the hollow portion of the magnetic yoke 405. The first coil 403 is wound in a rectangular shape of 2.7 mm×7.0 mm (inner periphery) and 4.6 mm×8.9 mm (outer periphery) so as to have a winding width of 3.0 mm. The first coil 403 is arranged so that its axis is parallel with the optical axis. The pulse current of 127 kHz is supplied to the first coil 403 in the voice coil motor 406, so that it is driven as a motor.

The cooling fan 500 is provided at a position of 26.5 mm from the rear surface of the printed circuit board 202 on which the imaging element 201 has been mounted. The brushless DC motor of the outer rotor type in the center portion of the cooling fan 500 has the magnetic core 505 of 17.0 mm (diameter) as a stator. The second coil 503 is wound in a circular shape of 5.9 mm (inner diameter) and 10.2 mm (outer diameter) so as to have a winding width of 2.0 mm. The second coil 503 is arranged so that its axis is parallel with the optical axis. The pulse current of 300 Hz is supplied to the second coil 503 in the cooling fan 500, so that it is driven as a motor.

As a sheet-like or plate-like magnetic member 600, a nano-crystal magnetic sheet of 18 μm (thickness) in which a relative permeability at a frequency of 30 Hz near a direct current is equal to 40,000 is used. In the sheet-like or plate-like magnetic member 600, the nano-crystal magnetic sheet is bent and the first magnetic portion 601, second magnetic portion 602, and third magnetic portion 603 are integratedly formed.

The first magnetic portion 601 of 5 mm×10 mm is arranged between the first coil 403 and the imaging element 201. The first magnetic portion 601 is located at a distance of 1.1 mm from the surface of the imaging element 201 and is located at a distance of 1.0 mm from the facing surface of the magnetic yoke 405. The surface of about 50% of the surface 4051 of the magnetic yoke 405 faces the first magnetic portion 601. A portion of the first magnetic portion 601 illustrated in FIG. 2 extending to the lower side along the edge portions of the two right and left sides of the imaging element 201 has a width of 1 mm and a length of 14 mm.

The second magnetic portion 602 of 20 mm×20 mm is arranged between the second coil 503 and the imaging element 201. The second magnetic portion 602 is located at a position which is away by 1.7 mm from the rear surface of the printed circuit board 202 on which the imaging element 201 has been mounted. The second magnetic portion 602 is formed so as to cover the rear surface of the imaging element 201 of 7.5 mm×8.0 mm.

As mentioned above, the third magnetic portion 603 connecting the first magnetic portion 601 and the second magnetic portion 602 is formed by the same material as that of the first magnetic portion 601 and the second magnetic portion 602. A size of the third magnetic portion 603 is equal to 10.0 mm (lateral width) and 6.7 mm (length).

Comparative Example 1

Figure 4A:
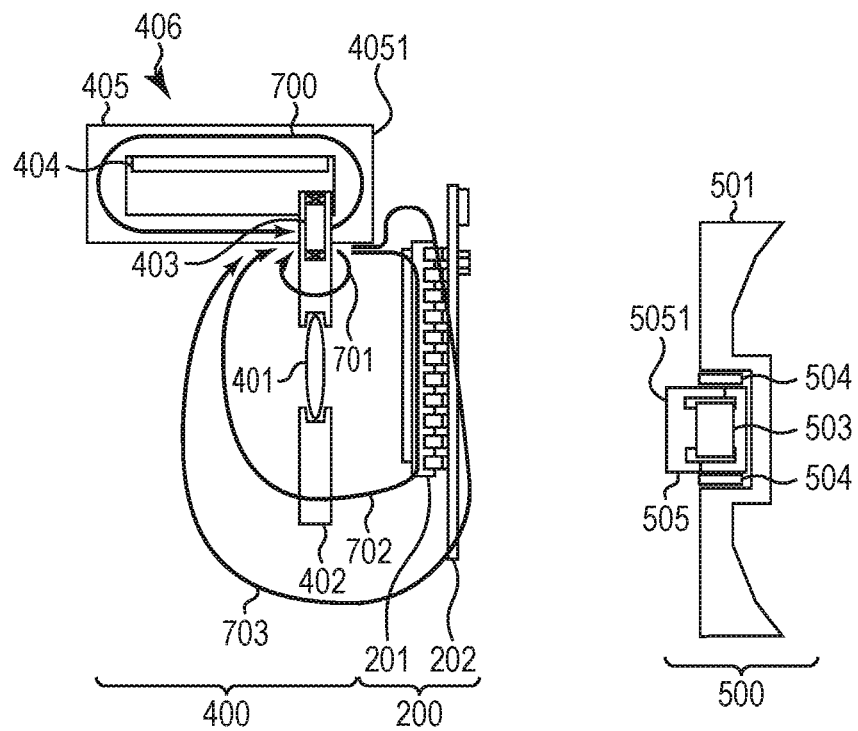
FIG. 4A is an explanatory diagram illustrating details of a main part of an imaging apparatus according to Comparative Example and a leakage magnetic field which is generated from its coil.
Figure 4B:
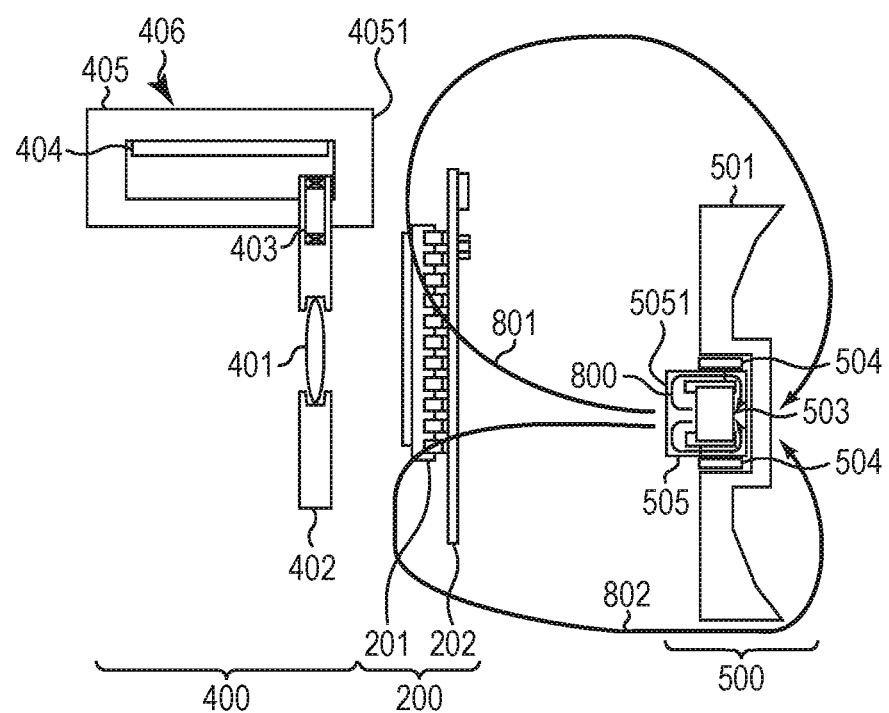
FIG. 4B is an explanatory diagram illustrating details of the main part of the imaging apparatus according to Comparative Example and the leakage magnetic field which is generated from the coil.

Comparative Example 1 has a construction illustrated in FIGS. 4A and 4B. Comparative Example 1 differs from Example 1 with respect to a point that all of the first magnetic portion 601, second magnetic portion 602, and third magnetic portion 603 are not provided. That is, in Comparative Example 1, the sheet-like or plate-like magnetic member 600 is not provided. A construction other than a point that the sheet-like or plate-like magnetic member 600 is not provided is similar to that in Example 1.

Comparative Example 2

Figure 5A:
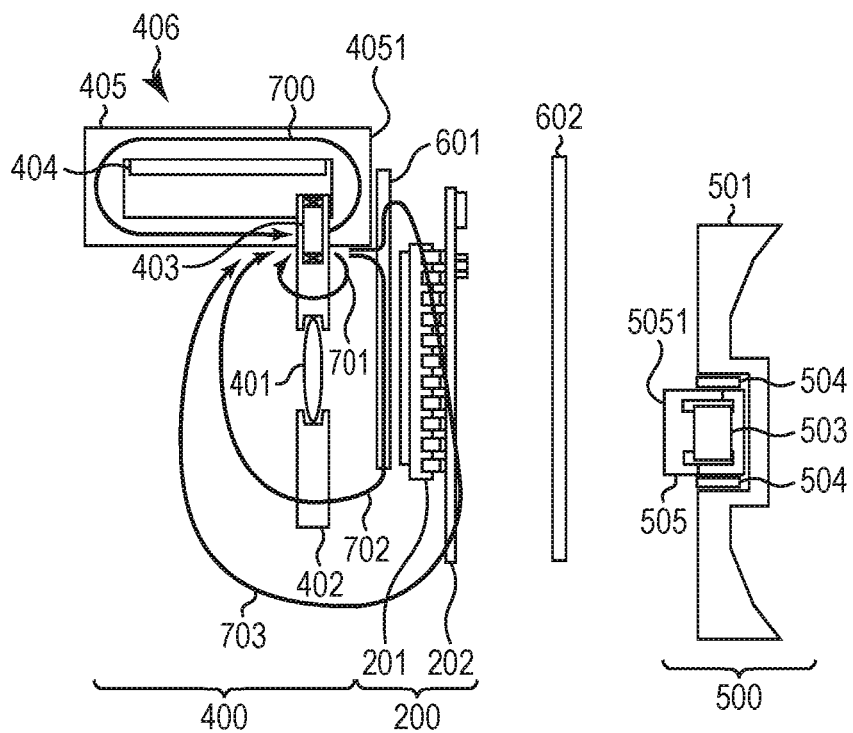
FIG. 5A is an explanatory diagram illustrating details of a main part of an imaging apparatus according to Comparative Example and a leakage magnetic field which is generated from its coil.
Figure 5B:
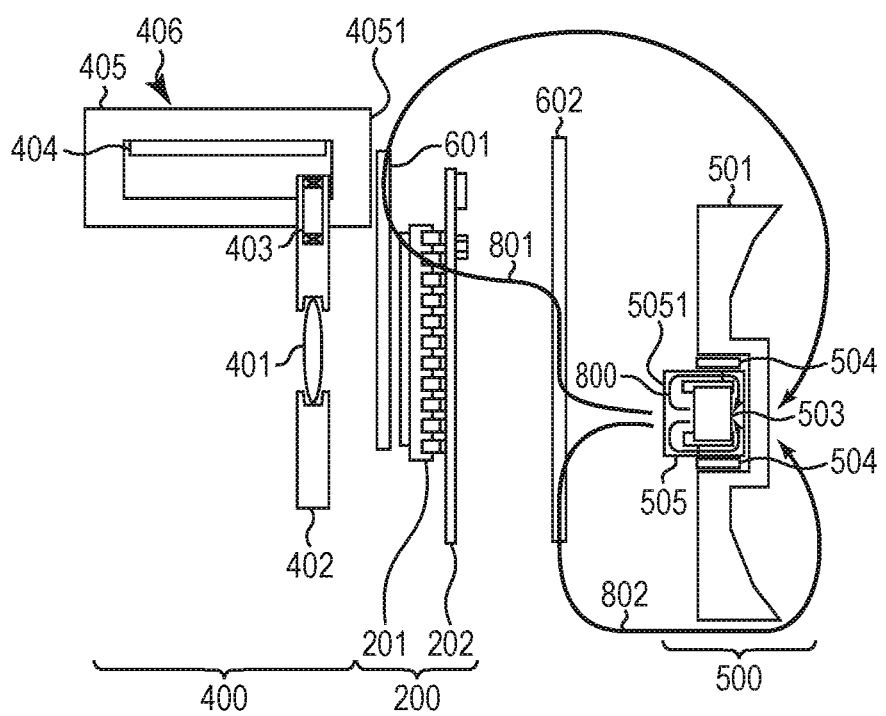
FIG. 5B is an explanatory diagram illustrating details of the main part of the imaging apparatus according to Comparative Example and the leakage magnetic field which is generated from the coil.

Comparative Example 2 has a construction illustrated in FIGS. 5A and 5B. In Comparative Example 2, although the first magnetic portion 601 and the second magnetic portion 602 are provided, it differs from Example 1 with respect to a point that the third magnetic portion 603 is not provided. That is, in Comparative Example 2, the first magnetic portion 601 and the second magnetic portion 602 are not connected but are independently separated. A construction other than a point that the first magnetic portion 601 and the second magnetic portion 602 are not connected is similar to that in Example 1.

With respect to each of foregoing Example 1 and Comparative Examples 1 and 2, an electromagnetic field simulation is performed by using commercially available electromagnetic field analyzing software and an arrival amount of a magnetic field which arrives at the imaging element 201 is obtained. In the electromagnetic field simulation, "Maxwell 3D" made by ANSYS Inc. is used as electromagnetic field analyzing software.

In the electromagnetic field simulation, a current which is supplied to the first coil 403 and the second coil 503 is a sine wave alternating current having a frequency of the current which is actually supplied to each coil. An analysis is independently performed every frequency. That is, a leakage magnetic field generated from each of the coils 403 and 503 is independently analyzed and thus an arrival amount of the magnetic field which arrives at the imaging element 201 from each of the coils 403 and 503 is independently obtained.

Figure 6:
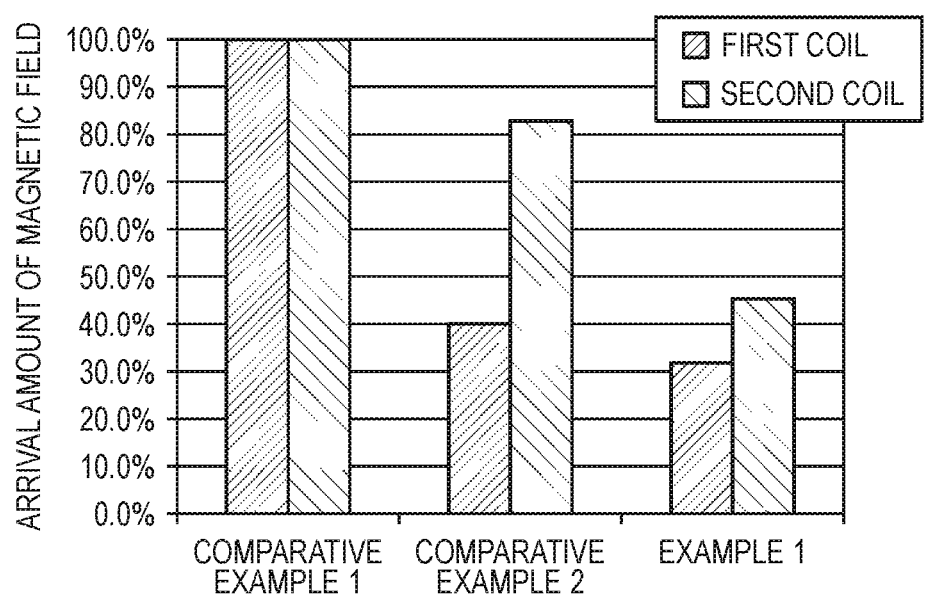
FIG. 6 is a graph illustrating results in each of which an arrival amount of a magnetic field which arrives at an imaging element was obtained by an electromagnetic field simulation.

FIG. 6 is a graph illustrating results in each of which an arrival amount of a magnetic field which arrives at a semiconductor portion of the imaging element 201 was obtained by the electromagnetic field simulation with respect to each of Example 1 and Comparative Examples 1 and 2. In FIG. 6, with respect to each of Example 1 and Comparative Examples 1 and 2, the arrival amount of the magnetic field which arrives at from the first coil 403 is illustrated in a bar graph on the left side, and the arrival amount of the magnetic field which arrives at from the second coil 503 is illustrated in a bar graph on the right side.

As an arrival amount of the magnetic field, a magnetic flux density in the semiconductor portion of the imaging element 201 is obtained. The arrival amount of the magnetic field is shown by a ratio in the case where the arrival amount in Comparative Example 1 is assumed to be 100%.

As compared with Comparative Example 1 in which the sheet-like or plate-like magnetic member 600 itself is not arranged, in Comparative Example 2, the first magnetic portion 601 and the second magnetic portion 602 which are not connected to each other are arranged. In Comparative Example 2, the arrival amount of the magnetic field from the first coil 403 is reduced to only about 40% of that in Comparative Example 1. This is because of the following reason.

FIG. 4A illustrates the leakage magnetic field from the first coil 403 in Comparative Example 1. In FIG. 4A, since the sheet-like or plate-like magnetic member 600 is not arranged, both of the magnetic transfer routes 702 and 703 are routes which pass the imaging element 201.

On the other hand, FIG. 5A illustrates the leakage magnetic field from the first coil 403 in Comparative Example 2. In FIG. 5A, since the first magnetic portion 601 is arranged, the magnetic transfer route 702 in the magnetic transfer routes 702 and 703 bypasses the imaging element 201. However, since the first magnetic portion 601 is not connected to the second magnetic portion 602, the magnetic transfer route 703 is a route which passes the imaging element 201.

As mentioned above, in Comparative Example 2, since the magnetic transfer route 702 bypasses, the arrival amount of the magnetic field which arrives at the imaging element 201 is reduced by a certain amount. However, in Comparative Example 2, since the magnetic transfer route 703 is a route which passes the imaging element 201, the arrival amount of the magnetic field which arrives at the imaging element 201 from the first coil 403 is reduced to only about 40% of that in Comparative Example 1.

In Comparative Example 2, the arrival amount of the magnetic field from the second coil 503 is reduced to only about 82% of that in Comparative Example 1. This is because of the following reason.

FIG. 4B illustrates the leakage magnetic field from the second coil 503 in Comparative Example 1. In FIG. 4B, since the sheet-like or plate-like magnetic member 600 is not arranged, both of the magnetic transfer routes 801 and 802 are routes which pass the imaging element 201.

On the other hand, FIG. 5B illustrates the leakage magnetic field generated from the second coil 503 in Comparative Example 2. In FIG. 5B, since the second magnetic portion 602 is arranged, the magnetic transfer route 802 in the magnetic transfer routes 801 and 802 bypasses the imaging element 201. However, since the second magnetic portion 602 is not connected to the first magnetic portion 601, the magnetic transfer route 801 is a route which passes the imaging element 201.

As mentioned above, in Comparative Example 2, since the magnetic transfer route 802 bypasses, the arrival amount of the magnetic field which arrives at the imaging element 201 is reduced by a certain amount. However, in Comparative Example 2, since the magnetic transfer route 801 is a route which passes the imaging element 201, the arrival amount of the magnetic field which arrives at the imaging element 201 from the second coil 503 is reduced to only about 82% of that in Comparative Example 1.

On the other hand, in Example 1, the arrival amount of the magnetic field from the first coil 403 is reduced to about 30% of that in Comparative Example 1. This is because of the following reason.

FIG. 3A illustrates the leakage magnetic field from the first coil 403 in Example 1. In FIG. 3A, since the first magnetic portion 601 and the second magnetic portion 602 mutually connected by the third magnetic portion 603 are arranged, both of the magnetic transfer routes 702 and 703 bypass the imaging element 201. Therefore, in Example 1, the arrival amount of the magnetic field from the first coil 403 is reduced to about 30% of that in Comparative Example 1.

In Example 1, the arrival amount of the magnetic field from the second coil 503 is reduced to about 45% of that in Comparative Example 1. This is because of the following reason.

FIG. 3B illustrates the leakage magnetic field from the second coil 503 in Example 1. In FIG. 3B, since the first magnetic portion 601 and the second magnetic portion 602 mutually connected by the third magnetic portion 603 are arranged, both of the magnetic transfer routes 801 and 802 bypass the imaging element 201. Therefore, in Example 1, the arrival amount of the magnetic field from the second coil 503 is reduced to about 45% of that in Comparative Example 1.

Particularly, it will be understood that, in Example 1, a suppressing effect to the leakage magnetic field from the second coil 503 in which a frequency of the supplied current is lower than that of the leakage magnetic field from the first coil 403 is higher than that in Comparative Example 2. According to the present embodiment, the arrival amount of the magnetic field which arrives at the imaging element 201 is reduced by a unique construction for realizing the bypass of the magnetic field and the coupling of the magnetic field to another device. That is, according to the unique construction of the present embodiment, first, the magnetic field is bypassed by the sheet-like or plate-like magnetic member 600. Further, according to the unique construction of the present embodiment, the leakage of the magnetic field which is propagated from the sheet-like or plate-like magnetic member 600 serving as a detour of the magnetic field to the imaging element 201 side is coupled with the magnetic yoke 405 in the voice coil motor 406 serving as another device on the side opposite to the imaging element 201. In this manner, according to the unique construction of the present embodiment, the arrival amount of the magnetic field which arrives at the imaging element 201 and, further, the printed circuit board 202 on which the imaging element 201 has been mounted is reduced. Such a result that the suppressing effect to the leakage magnetic field from the second coil 503 in Example is higher than that in Comparative Example 2 shows that the effect by the unique construction appears typically.

If the arrival amount of the magnetic field which arrives at the imaging element 201 can be reduced to, for example, the arrival amount in Example 1 as mentioned above, a disturbance of the image which occurs in the imaging element 201 of a high sensitivity can be sufficiently suppressed.

Subsequently, results obtained by the detailed examination with respect to the unique construction to realize the bypass of the magnetic field and the coupling of the magnetic field to another device mentioned above will be described.

First, a degree of coupling of the magnetic field is changed by changing the facing area between the first magnetic portion 601 and the magnetic yoke 405. If the arrival amount of the magnetic field which arrives at the imaging element 201 decreases as the degree of coupling is larger, it can be shown that the arrival amount of the magnetic field which arrives at the imaging element 201 is reduced by the foregoing unique construction.

Figure 7A:
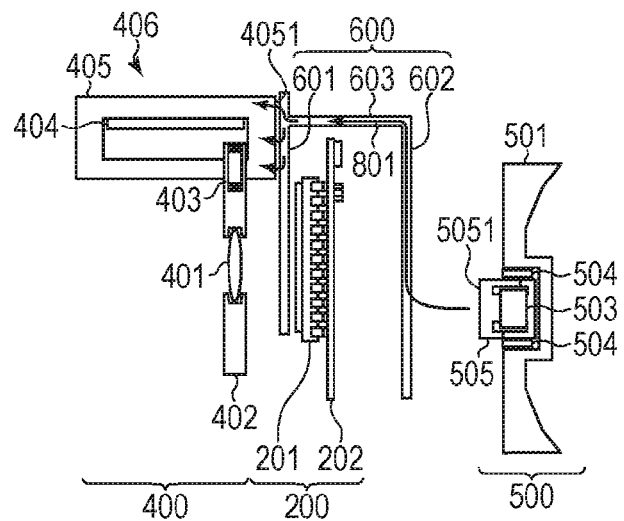
FIG. 7A is an explanatory diagram illustrating details of the main part of the imaging apparatus according to the first embodiment of the present invention and the leakage magnetic field which is generated from the coil.
Figure 7B:
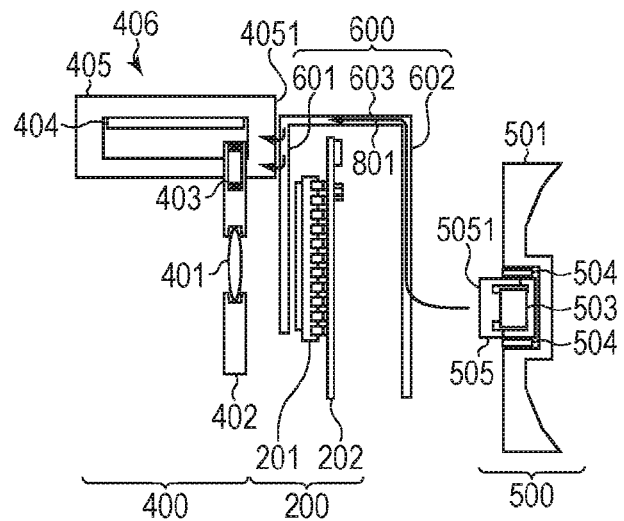
FIG. 7B is an explanatory diagram illustrating details of the main part of the imaging apparatus according to the first embodiment of the present invention and the leakage magnetic field which is generated from the coil.
Figure 7C:
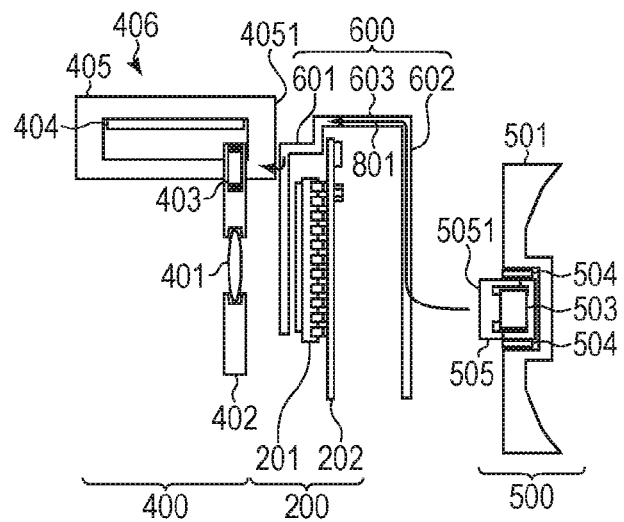
FIG. 7C is an explanatory diagram illustrating details of the main part of the imaging apparatus according to the first embodiment of the present invention and the leakage magnetic field which is generated from the coil.

FIGS. 7A, 7B, and 7C are diagrams illustrating the case where the area ratio of the surface 4051 (of the magnetic yoke 405 of the first coil 403) which faces the first magnetic portion 601 changes. FIG. 7A shows the case where the surface of the area ratio 100% of the surface 4051 of the magnetic yoke 405 faces the first magnetic portion 601. FIG. 7B shows the case of foregoing Example 1 where the surface of the area ratio 50% of the surface 4051 of the magnetic yoke 405 faces the first magnetic portion 601. FIG. 7C shows the case of Example 3 where the surface of the area ratio 18% of the surface 4051 of the magnetic yoke 405 faces the first magnetic portion 601. Those cases will be described in detail hereinafter.

Example 2

Example 2 will be described with reference to FIG. 7A with respect to only a point different from Example 1. In Example 2, a length in the upper direction of the first magnetic portion 601 is extended by an amount of 3.5 mm or more as compared with that in Example 1 so as to be higher than the upper surface of the magnetic yoke 405. Therefore, in Example 2, the surface of the area ratio 100% of the surface 4051 of the magnetic yoke 405 faces the first magnetic portion 601.

Example 3

Example 3 will be described with reference to FIG. 7C with respect to only a point different from Example 1. In Example 3, a length in the upper direction of the first magnetic portion 601 is shortened by 1.1 mm. Therefore, in Example 3, the surface of the area ratio 18% of the surface 4051 of the magnetic yoke 405 faces the first magnetic portion 601. Since the length in the upper direction of the first magnetic portion 601 is shortened, the third magnetic portion 603 is bent.

Figure 8:
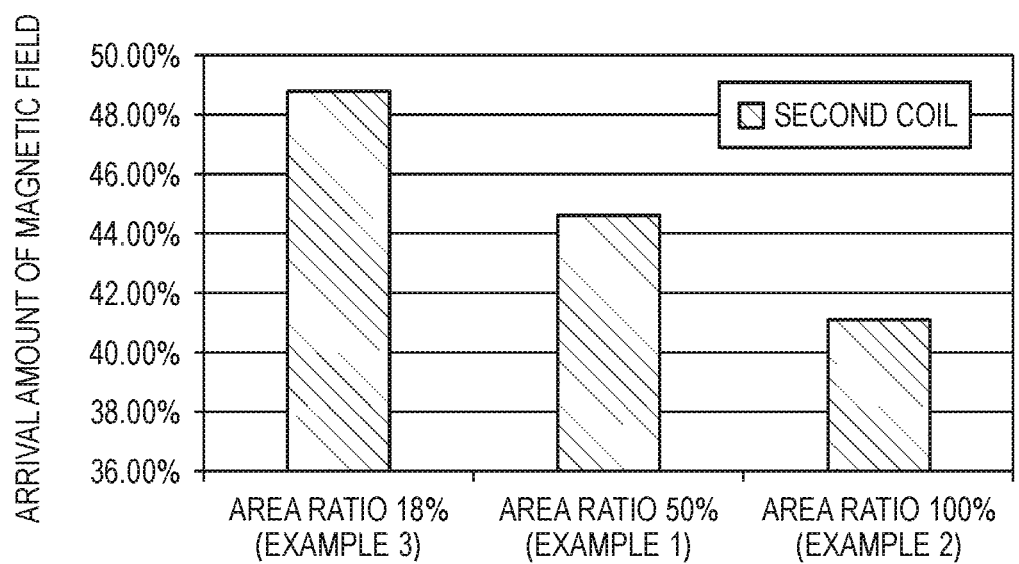
FIG. 8 is a graph illustrating results in each of which an arrival amount of a magnetic field which arrives at an imaging element was obtained by an electromagnetic field simulation.

FIG. 8 is a graph illustrating results in each of which an arrival amount of a magnetic field which arrives at a semiconductor portion of the imaging element 201 was obtained by an electromagnetic field simulation with respect to each of Examples 1 to 3. The electromagnetic field simulation was performed in a manner similar to the case illustrated in FIG. 6. In FIG. 8, the arrival amount of the magnetic field which arrives at from the second coil 503 is shown by a bar graph with respect to each of Examples 1 to 3. As an arrival amount of the magnetic field, a magnetic flux density in the semiconductor portion of the imaging element 201 is obtained. The arrival amount of the magnetic field is shown by a ratio in the case where the arrival amount in Comparative Example 1 mentioned above is assumed to be 100%.

Referring to FIG. 8, in any of Examples 1 to 3, the arrival amount of the magnetic field is smaller than that in the case of Comparative Example 2 illustrated in FIG. 6. It will be understood that as the area ratio in the case where the surface 4051 of the magnetic yoke 405 faces the first magnetic portion 601 increases, the arrival amount of the magnetic field which arrives at the imaging element 201 is further reduced. The results shown in FIG. 8 can be described as follows.

FIGS. 7A, 7B, and 7C are diagrams illustrating states where the leakage magnetic field generated from the second coil 503 is propagated with respect to each of Examples 1 to 3. In any of those diagrams, the leakage magnetic field passes the magnetic transfer route 801 and is propagated to the surface 4051 of the magnetic yoke 405 of the coil 403 through the first magnetic portion 601.

A propagation amount of the leakage magnetic field which is propagated as mentioned above is smallest in Example 3 illustrated in FIG. 7C among Examples 1 to 3. Subsequently, a propagation amount of the leakage magnetic field increases in order of Example 1 illustrated in FIG. 7B and Example 2 illustrated in FIG. 7A. This is because the area ratio of the surface 4051 (of the magnetic yoke 405) which faces the first magnetic portion 601 is smallest in Example 3 among Examples 1 to 3 and, subsequently, it increases in order of Example 1 and Example 2. As the area ratio of the surface 4051 (of the magnetic yoke 405) which faces the first magnetic portion 601 increases in order of Example 3 illustrated in FIG. 7C, Example 1 illustrated in FIG. 7B, and Example 2 illustrated in FIG. 7A, the propagation amount of the leakage magnetic field to the magnetic yoke 405 increases.

That is, the increase in propagation amount of the magnetic field to the magnetic yoke 405 side corresponds to an increase in amount of the magnetic field which bypasses the imaging element 201. Therefore, the effect obtained by bypassing the magnetic field increases and thus the arrival amount of the magnetic field which arrives at the imaging element 201 decreases. When considering it as a magnetic circuit, it means that a magnetic resistance between the first magnetic portion 601 serving as a magnetic transfer route and the magnetic yoke 405 was reduced by increasing the facing area between the magnetic members.

It has been proved that by bypassing the leakage magnetic field by the sheet-like or plate-like magnetic member 600 and further coupling the leakage of the magnetic field from its detour to the magnetic yoke 405 in another device on the side opposite to the imaging element 201 as mentioned above, the arrival amount of the magnetic field which arrives at the imaging element 201 or the like decreases.

It is desirable that the area ratio of the surface 4051 (of the magnetic yoke 405) which faces the first magnetic portion 601 is equal to 10% or more. By setting the area ratio of the facing surface to 10% or more, the propagation amount of the magnetic field to the magnetic yoke 405 side is sufficiently increased and the arrival amount of the magnetic field to the imaging element 201 can be sufficiently reduced.

Subsequently, a positional relation between the first magnetic portion 601 and the magnetic yoke 405 of the coil 403 will be described further in detail with reference to FIG. 9.

Figure 9:
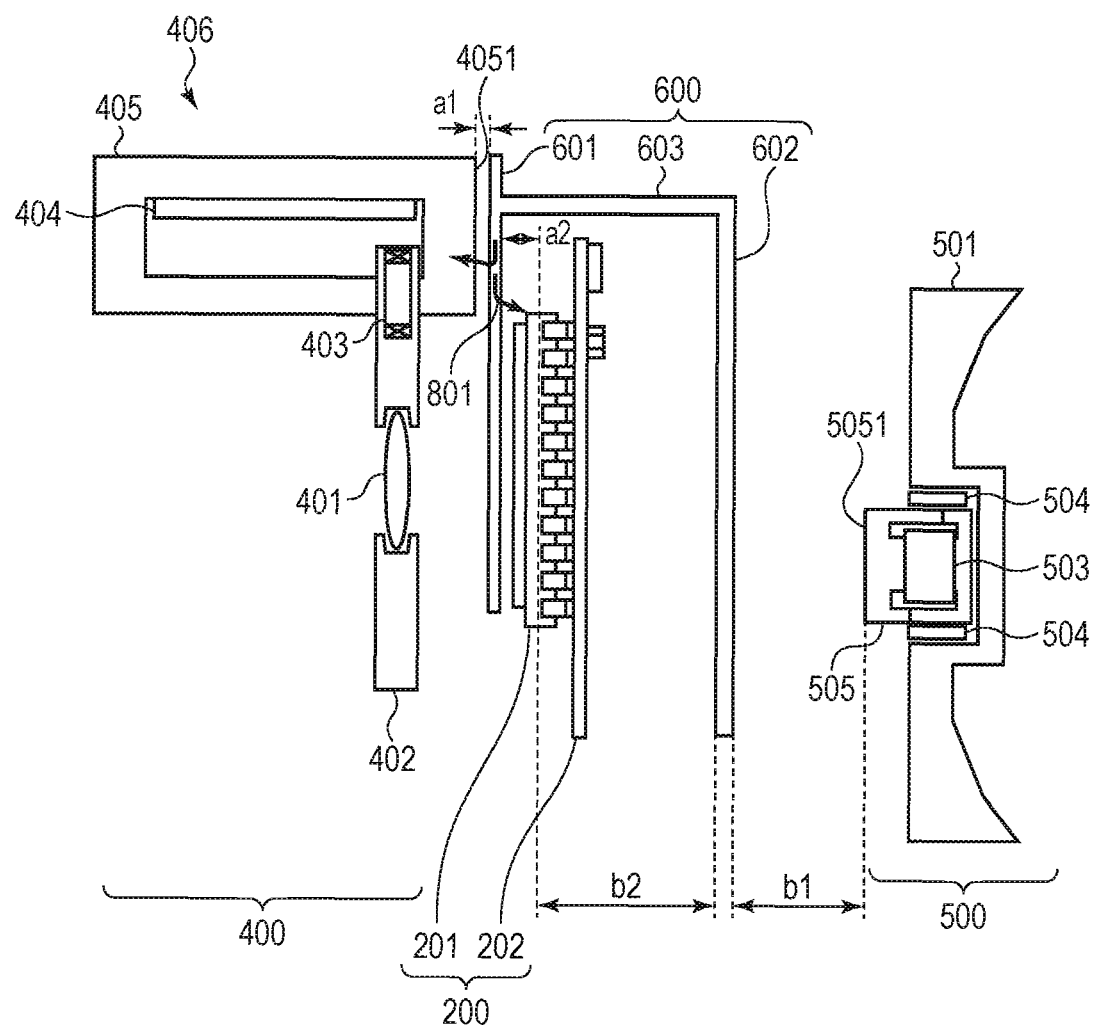
FIG. 9 is an explanatory diagram illustrating details of the main part of the imaging apparatus according to the first embodiment of the present invention and a positional relation of a magnetic member to the imaging element.

In FIG. 9, a distance between the first magnetic portion 601 and the surface 4051 of the magnetic yoke 405 of the coil 403 is equal to a1. A distance between the first magnetic portion 601 and the surface of the imaging element 201 is equal to a2. The arrival amount of the magnetic field to the imaging element 201 changes in dependence on a relation between the distances a1 and a2.

A description will be made based on specific Examples. In foregoing Example 2, the distance a1 is equal to 1.0 mm and the distance a2 is equal to 1.1 mm.

Example 4

In Example 4, in FIG. 9, the distance a1 is equal to 1.5 mm, the distance a2 is equal to 0.6 mm, and other points are similar to those in Example 2.

Example 5

In Example 5, in FIG. 9, the distance a1 is equal to 0.5 mm, the distance a2 is equal to 1.6 mm, and other points are similar to those in Example 2.

In foregoing Examples 2, 4, and 5, the distance a2 increases in order of Example 4, Example 2, and Example 5 and the distance a1 decreases contrarily in association with it.

Figure 10:
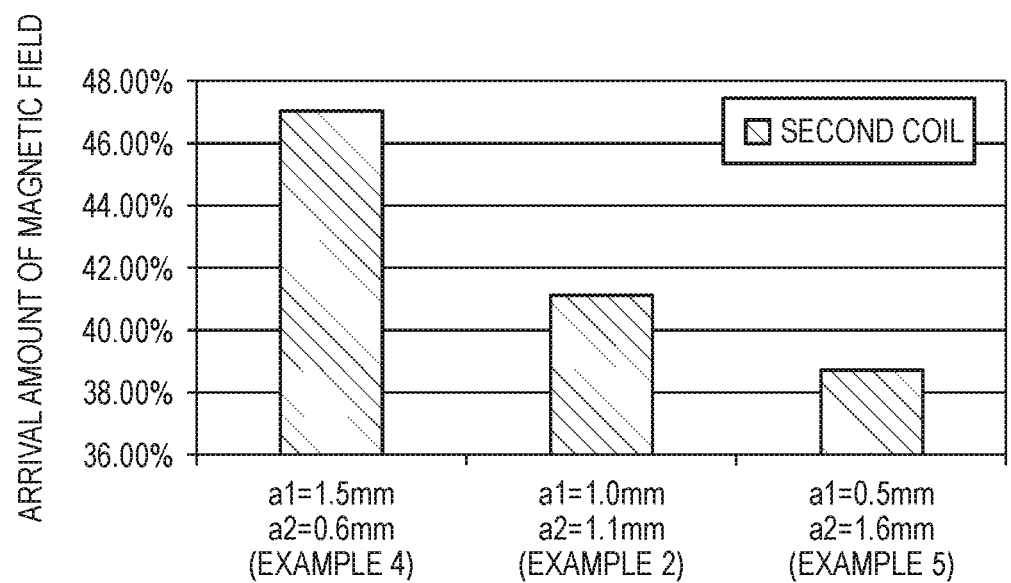
FIG. 10 is a graph illustrating results in each of which an arrival amount of a magnetic field which arrives at an imaging element was obtained by an electromagnetic field simulation.

An arrival amount of the magnetic field which arrives at the semiconductor portion of the imaging element 201 was obtained by the electromagnetic field simulation with respect to each of Examples 4, 2, and 5. FIG. 10 is a graph illustrating results in each of which the arrival amount of the magnetic field which arrives at the semiconductor portion of the imaging element 201 was obtained by the electromagnetic field simulation with respect to each of Examples 4, 2, and 5. The electromagnetic field simulation was performed in a manner similar to that shown in FIG. 6. In FIG. 10, the arrival amount of the magnetic field which arrives at from the second coil 503 is shown by a bar graph with respect to each of Examples 4, 2, and 5. As an arrival amount of the magnetic field, a magnetic flux density in the semiconductor portion of the imaging element 201 is obtained. The arrival amount of the magnetic field is shown by a ratio in the case where the arrival amount in foregoing Comparative Example 1 is assumed to be 100%.

In FIG. 10, it will be understood that as the distance a2 increases and the distance a1 decreases in order of Examples 4, 2, and 5, the arrival amount of the magnetic field which arrives at the imaging element 201 is reduced. The results shown in FIG. 10 can be described as follows with reference to FIG. 9.

The leakage magnetic field which was generated from the second coil 503 and reached the first magnetic portion 601 by passing the magnetic transfer route 801 can be propagated to the two kinds of routes such as a route by which it is propagated to the magnetic yoke 405 of the first coil 403 and a route by which it is propagated to the imaging element 201. The proper route to which the leakage magnetic field is propagated is determined by the distances a1 and a2. That is, when the distance a1 is smaller than the distance a2, a magnetic resistance of the route by which it is propagated to the magnetic yoke 405 is sufficiently small. Therefore, the propagation amount of the magnetic field to the route to the imaging element 201 side can be further reduced. Consequently, the arrival amount of the magnetic field which arrives at the imaging element 201 can be reduced.

Therefore, it is desirable that the first magnetic portion 601 is arranged between the magnetic yoke 405 and the imaging element 201 so that the distance a1 is smaller than the distance a2. That is, it is desirable that the first magnetic portion 601 is arranged near the magnetic yoke 405 than the imaging element 201. The distances a1 and a2 can be properly set in accordance with a suppression amount of a disturbance of the image which is necessary in the actual product.

Also with respect to the second magnetic portion 602, it can be constructed in a manner similar to the foregoing first magnetic portion 601, and the arrival amount of the leakage magnetic field generated from the first coil 403 which arrives at the imaging element 201 can be reduced.

As illustrated in FIG. 9, the magnetic core 505 of the coil 503 has the surface 5051 which faces the second magnetic portion 602. In FIG. 9, the surface of the area ratio 100% of the surface 5051 of the magnetic core 505 faces the second magnetic portion 602. Although the area ratio of the surface 5051 of the magnetic core 505 which faces the second magnetic portion 602 is not limited to 100%, by increasing such an area ratio, the arrival amount of the leakage magnetic field generated from the first coil 403 which arrives at the imaging element 201 can be further reduced.

It is desirable that the area ratio of the surface 5051 of the magnetic core 505 which faces the second magnetic portion 602 is equal to 10% or more. By setting the area ratio of the facing surface to 10% or more, the propagation amount of the magnetic field to the magnetic core 505 side is sufficiently increased and thus the arrival amount of the magnetic field to the imaging element 201 can be sufficiently reduced.

A distance between the surface 5051 of the magnetic core 505 of the second coil 503 and the second magnetic portion 602 can be set to be smaller than a distance between the second magnetic portion 602 and the surface of the imaging element 201. In FIG. 9, the distance between the surface 5051 of the magnetic core 505 and the second magnetic portion 602 is equal to b1. The distance between the second magnetic portion 602 and the surface of the imaging element 201 is equal to b2.

The second magnetic portion 602 can be arranged between the magnetic core 505 and the imaging element 201 so that the distance b1 is smaller than the distance b2. That is, the second magnetic portion 602 can be arranged near the magnetic core 505 than the imaging element 201. If the distance b1 is smaller than the distance b2, a magnetic resistance of the route by which the magnetic field is propagated to the magnetic core 505 decreases. Therefore, the magnetic field propagation amount to the route to the imaging element 201 side can be further reduced, so that the arrival amount of the magnetic field which arrives at the imaging element 201 can be reduced. The distances b1 and b2 can be also properly set in accordance with a suppression amount of a disturbance of the image which is necessary in the actual product in a manner similar to the distances a1 and a2.

Also with respect to the second magnetic portion 602, by constructing it as mentioned above, the leakage magnetic field 701 which is generated from the first coil 403 is propagated to the second magnetic portion 602 through the third magnetic portion 603 and is further propagated therefrom to the magnetic core 505 side. Therefore, such an effect that the arrival amount of the magnetic field which arrives at the imaging element 201 is further reduced is obtained.

Subsequently, a material which is used in the foregoing sheet-like or plate-like magnetic member 600, that is, a material which is used in the first magnetic portion 601, second magnetic portion 602, and third magnetic portion 603 will be described.

As a material of the sheet-like or plate-like magnetic member 600, for example, a stainless steel sheet such as SUS430, SUS630, or the like, an SPCC steel sheet (cold-rolled steel), or a galvanized sheet iron such as partial Silver Top (trademark) or the like can be used. Those materials are magnetic materials of a comparatively small relative permeability and, particularly, a relative permeability which is equal to or larger than 50 and is equal to or smaller than 1000. Those materials can be desirably used as a material of the sheet-like or plate-like magnetic member 600. However, a material such as aluminum, copper, SUS304, conductive plastics, or the like having a relative permeability of almost 1, that is, a material other than the magnetic material cannot be used as a material of the sheet-like or plate-like magnetic member 600.

As a material of the sheet-like or plate-like magnetic member 600, a nano-crystal soft magnetic sheet such as FINEMET (registered trademark) or the like as a magnetic material of a comparatively high relative permeability can be also used. As another material, a noise suppression sheet (containing magnetic powder, magnetic filler, or magnetic film) of a high relative permeability such as permalloy, amorphous magnetic material, ferrite, electromagnetic steel, or BUSTERAID (registered trademark), or the like can be also used. In this case, a higher effect can be expected.

Figure 11:
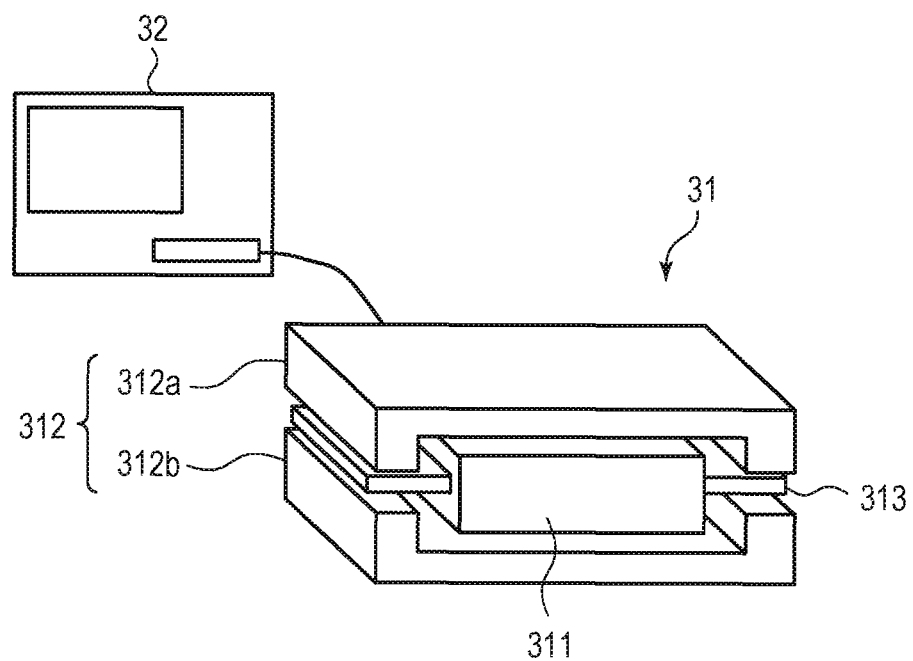
FIG. 11 is an explanatory diagram illustrating a measuring system for measuring a relative permeability.

The relative permeability of the material constructing the sheet-like or plate-like magnetic member 600 will be described. The relative permeability of the magnetic material changes in dependence on a frequency of the magnetic field. The relative permeability of such a magnetic material can be measured by using a measuring system illustrated in FIG. 11. FIG. 11 is an explanatory diagram illustrating the measuring system for measuring the relative permeability.

In the measuring system illustrated in FIG. 11, a tool 31 which can measure a plate-like measurement sample 313 by "methods of measurement of the magnetic properties of magnetic steel sheet and strip by means of a single sheet tester" specified in JIS C 2556 is used. The tool 31 includes a double yoke frame 312 having a lower yoke 312a and an upper yoke 312b, and a coil 311 surrounded by the double yoke frame 312. An LCR meter 32 is connected to the coil 311. An impedance analyzer can be also used in place of the LCR meter 32.

In the measurement of the relative permeability, the measurement sample 313 formed in a plate shape is sandwiched in the double yoke frame 312 and is inserted into the coil 311. Subsequently, by frequency-sweeping an AC signal to the coil 311 by the LCR meter 32, frequency characteristics of an inductance value are obtained. The inductance value in a state where no sample is inserted is used as a reference and a real part μ' of a complex relative permeability is obtained by the following equation (1) from the inductance value in the case where the measurement sample 313 has been inserted. A magnetic flux density which is applied to the measurement sample 313 is equal to 1 [μT] or less at each frequency. Therefore, an initial permeability of the material which acts in response to weak magnetic field noises is obtained.

$$\mu' = \frac{L(L_{\mathit{eff}} - L_w)}{\mu_0 N^2 A} \qquad (1)$$

Where, N denotes the number of turns of the coil 311. $\mu_0$ denotes a magnetic permeability of the vacuum and its value is equal to $4\pi \times 10^{-7}$ [H/m]. A denotes a cross sectional area of the measurement sample 313. L denotes a length of the measurement sample 313. $L_{\mathit{eff}}$ denotes an inductance measurement value obtained by the LCR meter 32. $L_w$ denotes an inductance measurement value obtained in the case where the measurement sample 313 is not inserted.

In the measurement by "measuring methods for characteristics of materials of ferrite cores" specified in JIS C 2561, since the measurement is performed by using a ring-like measurement sample, it should be noted that, particularly, a thickness dependency of the magnetic permeability of the sheet-like or plate-like magnetic member cannot be accurately obtained.

Figure 12:
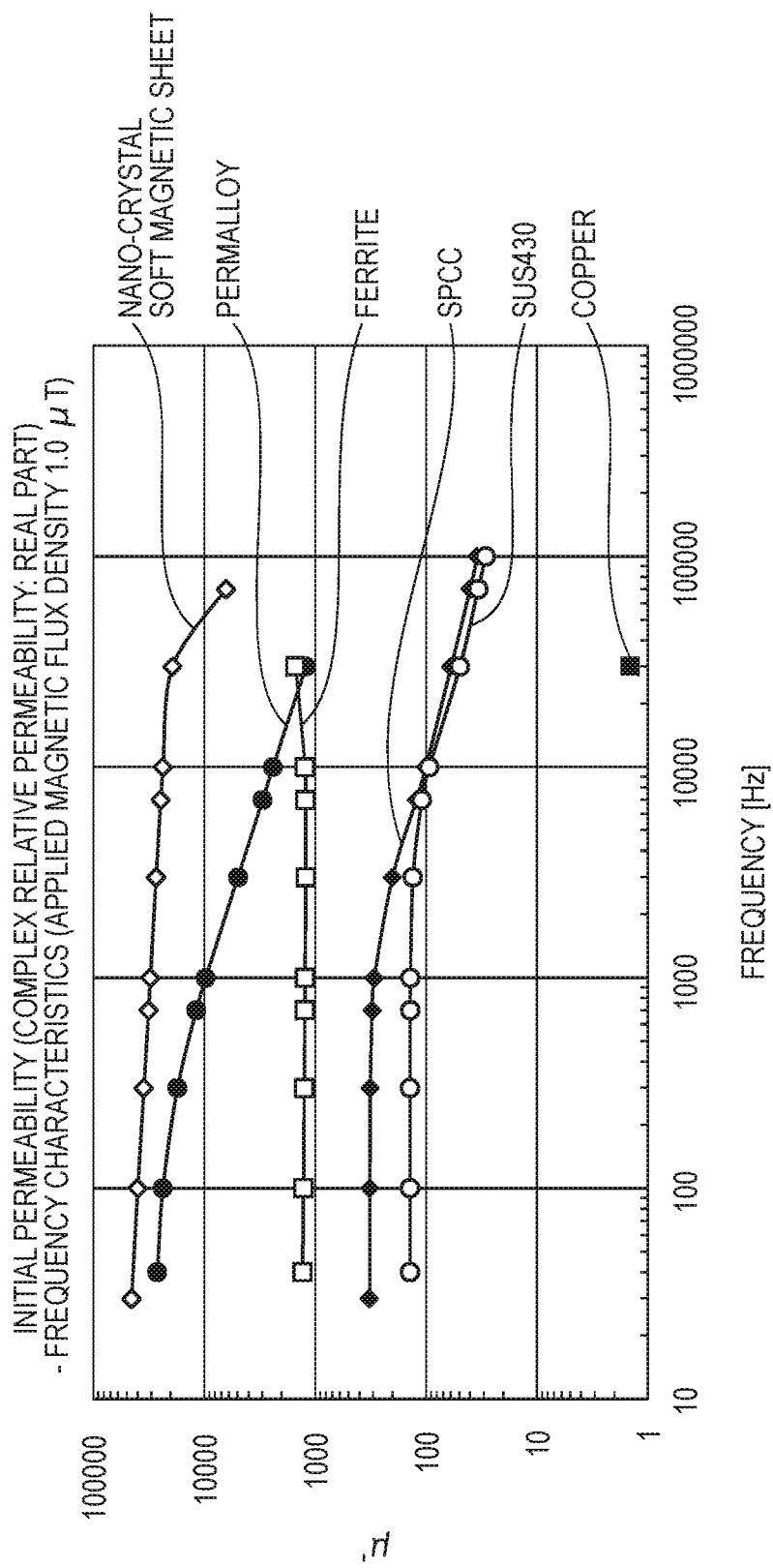
FIG. 12 is a graph illustrating results in each of which the relative permeability was measured with respect to various kinds of materials.

FIG. 12 illustrates results in which the relative permeabilities of various kinds of materials were measured by the foregoing measuring system shown in FIG. 11. FIG. 12 is a graph illustrating the results in which the relative permeabilities were measured with respect to the various kinds of materials such as nano-crystal soft magnetic sheet, permalloy, ferrite, SPCC, SUS430, and copper.

Referring to FIG. 12, a state where in almost all of the magnetic materials, when the frequency rises, the relative permeability decreases is observed. This is because when the magnetic field of a high frequency has entered the sheet-like or plate-like magnetic member, an eddy current flows into the sheet-like or plate-like magnetic member in such a direction as to cancel the magnetic field. It is difficult that the magnetic field enters the magnetic member due to an effect of such an eddy current. Such a phenomenon corresponds to a decrease in effective relative permeability. Therefore, such a state that when the frequency rises, the relative permeability decreases is observed. A reason why the frequency at which the decrease in relative permeability starts differs every material is that a frequency band in which the eddy current is liable to flow differs in dependence on a conductivity and a thickness of the magnetic material.

Although a thickness of the sheet-like or plate-like magnetic member 600 is not particularly limited, even in the case of the same material of the magnetic member, by thinning the magnetic member 600, the effective relative permeability can be further raised. Therefore, when the sheet-like or plate-like magnetic member 600 is formed, it is desirable to consider not only a kind of such a material but also its thickness.

It is desirable that the relative permeability of the sheet-like or plate-like magnetic member 600 is equal to 10 or more, more desirably, 50 or more within a range of 1 kHz to 10 MHz serving as a frequency of the leakage magnetic field which becomes the magnetic field noises. If the sheet-like or plate-like magnetic member 600 having such a relative permeability is used, a sufficient effect of propagating the magnetic field is obtained. Although an upper limit value of the relative permeability of the sheet-like or plate-like magnetic member 600 is not particularly limited, the relative permeability of the sheet-like or plate-like magnetic member 600 within a range of, for example, 200000 or less serving as a relative permeability of the material which can be industrially used can be selected.

On the basis of a graph obtained by measuring the relative permeability of the magnetic material like a graph illustrated in FIG. 12 mentioned above, the effective magnetic material can be selected in accordance with the frequency of the leakage magnetic field so as to suppress the arrival to the imaging element 201. Even in the case of using a material other than the material shown in FIG. 12, by measuring the relative permeability by the measuring method shown here, the magnetic material suitable for suppression of the magnetic field noises can be selected.

In the present embodiment, it is not always necessary to form the sheet-like or plate-like magnetic member 600 by the single magnetic material, but it can be also formed as a complex member by combining different magnetic materials.

For example, in the sheet-like or plate-like magnetic member 600 illustrated in FIG. 2, the first magnetic portion 601 and the third magnetic portion 603 can be formed by using the nano-crystal soft magnetic sheet showing a comparatively high relative permeability. On the other hand, the second magnetic portion 602 can be formed by using thick SUS430 or SPCC showing a lower relative permeability as compared with those of the first magnetic portion 601 and the third magnetic portion 603.

Consequently, the leakage magnetic field of the first coil 403 which is driven at a high frequency is effectively absorbed by the nano-crystal soft magnetic sheet inherently having the high relative permeability and constructing the facing first magnetic portion 601. This is because although the relative permeability of the first magnetic portion 601 decreases due to the high frequency of the leakage magnetic field, since the inherent relative permeability is high, even if such a relative permeability decreases, it is equal to or larger than a certain effective value. The leakage magnetic field is propagated to the second magnetic portion 602 arranged behind the imaging element 201. Therefore, even if the second magnetic portion 602 is made of the material of a comparatively low relative permeability, a predetermined effect of bypassing the magnetic field is obtained and thus the arrival amount of the magnetic field to the imaging element 201 can be reduced.

On the other hand, a frequency of the leakage magnetic field generated from the second coil 503 which is driven at a lower frequency than that of the first coil 403 is lower than that of the leakage magnetic field generated from the first coil 403. Therefore, the leakage magnetic field generated from the second coil 503 is sufficiently effectively absorbed even by thick SUS430 or SPCC showing a comparatively low relative permeability and forming the second magnetic portion 602. Thus, in a manner similar to the leakage magnetic field from the first coil 403, even with respect to the leakage magnetic field of the second coil 503, the bypassing effect of the magnetic field is obtained and thus the arrival amount of the magnetic field to the imaging element 201 can be reduced.

In the above case, as compared with the case where the nano-crystal magnetic sheet showing the high relative permeability is used as a material of all of the first magnetic portion 601, second magnetic portion 602, and third magnetic portion 603, they can be constructed at low costs.

The printed circuit board 202 on which the imaging element 201 is mounted can be attached and fixed by a screw or the like to thick SUS430 or SPCC constructing the second magnetic portion 602. By fixing the printed circuit board 202 to SUS430 or SPCC having a high rigidity as mentioned above, a rigidity of the imaging unit 200 can be also raised. Consequently, a durability of the imaging apparatus 100 to a shock at the time when it drops is improved and such an associated effect that the reliability of the apparatus is improved as a result is also obtained.

The material of the composite member is not limited to the foregoing combination but various kinds of materials can be properly combined.

According to the present embodiment, even in the case where the imaging element 201 is sandwiched by the two coils 403 and 503, the arrival amount of the leakage magnetic field generated from each coil which arrives at the imaging element 201 can be reduced. Therefore, even if the imaging element 201 executes the reading operation to read out the image signal, an influence of the magnetic field is small and the inherent image signal can be desirably read out, so that the occurrence of a disturbance of the image can be suppressed.

Second Embodiment

An imaging apparatus according to the second embodiment of the present invention will be described. Component elements similar to those in the foregoing first embodiment are designated by the same reference numerals and their description is omitted or simplified.

A fundamental construction of the imaging apparatus according to the present embodiment is substantially similar to that of the imaging apparatus according to the first embodiment. The imaging apparatus according to the present embodiment differs from the imaging apparatus according to the first embodiment with respect to a point that an edge portion of the first magnetic portion 601 and an edge portion of the second magnetic portion 602 are bent. The second embodiment will be described hereinafter with reference to FIG. 13 with respect to only a point different from the first embodiment.

Figure 13:
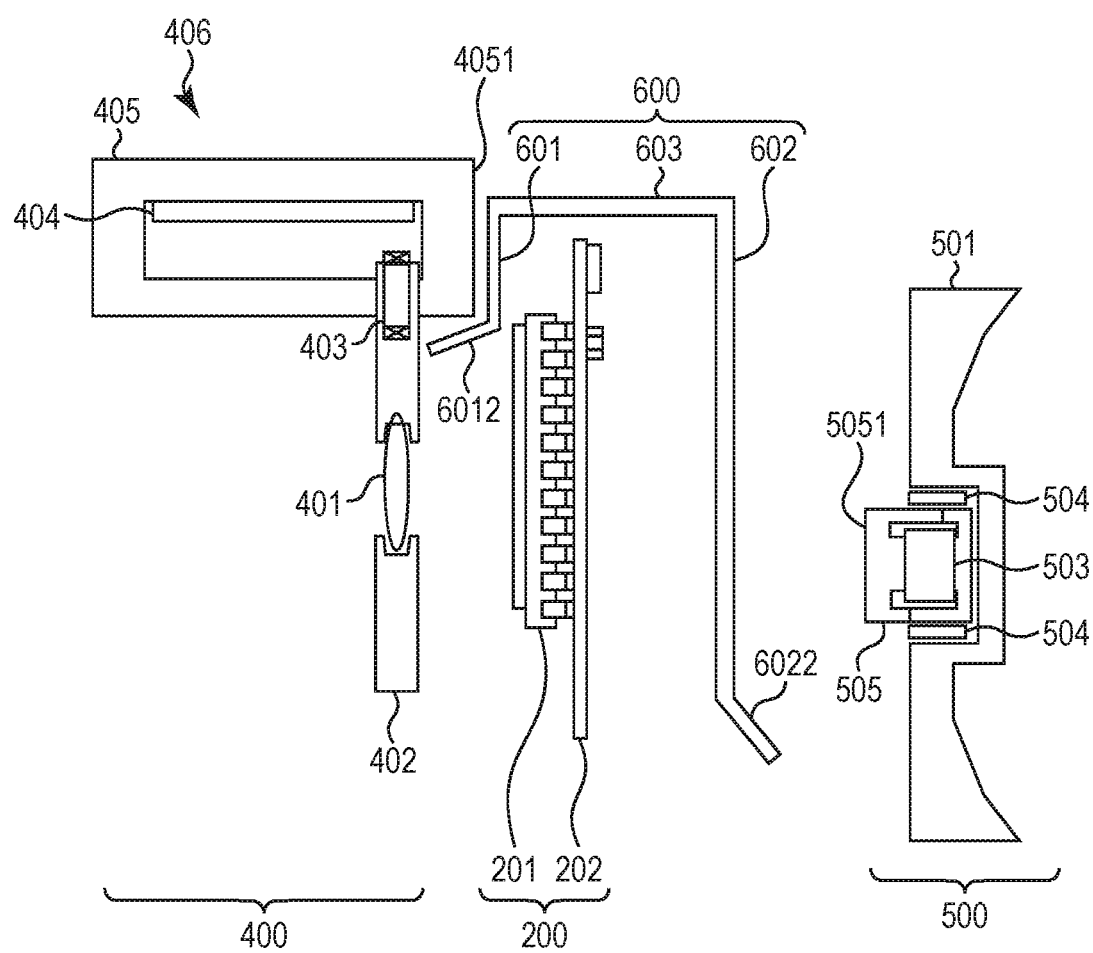
FIG. 13 is an explanatory diagram illustrating details of a main part of an imaging apparatus according to the second embodiment of the present invention.

As illustrated in FIG. 13, in the imaging apparatus according to the present embodiment, a lower edge portion 6012 (of the first magnetic portion 601) to which the third magnetic portion 603 is not connected is bent toward the first coil 403 on the side opposite to the imaging element 201. A lower edge portion 6022 (of the second magnetic portion 602) to which the third magnetic portion 603 is not connected is bent toward the second coil 503 on the side opposite to the imaging element 201.

In the present embodiment, the first magnetic portion 601 is provided at a position closer to the first coil 403 as a region where an intensity of the leakage magnetic field is larger because the edge portion 6012 of the first magnetic portion 601 has been bent. Therefore, the leakage magnetic field generated from the first coil 403 is more effectively attracted to the first magnetic portion 601. Thus, the arrival amount of the magnetic field which arrives at the imaging element 201 can be further reduced.

Then, the leakage magnetic field which was propagated from the first magnetic portion 601 to the second magnetic portion 602 through the third magnetic portion 603 is propagated from its edge portion to the external space. At this time, since the edge portion 6022 of the second magnetic portion 602 has been bent toward the second coil 503 on the side opposite to the imaging element 201, the leakage magnetic field which is emitted from the edge portion 6022 is propagated to the side opposite to the imaging element 201. Thus, an effect of further reducing the arrival amount of the magnetic field which arrives at the imaging element 201 is also obtained.

A similar effect is also obtained with respect to the leakage magnetic field which is generated from the second coil 503. That is, the second magnetic portion 602 is provided at a position closer to the second coil 503 as a region where an intensity of the leakage magnetic field is larger because the edge portion 6022 of the second magnetic portion 602 has been bent. Therefore, the leakage magnetic field generated from the second coil 503 is more effectively attracted to the second magnetic portion 602. Thus, the arrival amount of the magnetic field which arrives at the imaging element 201 can be further reduced.

Then, the leakage magnetic field which was propagated from the second magnetic portion 602 to the first magnetic portion 601 through the third magnetic portion 603 is propagated from its edge portion to the external space. At this time, since the edge portion 6012 of the first magnetic portion 601 has been bent toward the first coil 403 on the side opposite to the imaging element 201, the leakage magnetic field which is emitted from the edge portion 6012 is propagated to the side opposite to the imaging element 201. Thus, an effect of further reducing the arrival amount of the magnetic field which arrives at the imaging element 201 is also obtained.

In this manner, in the present embodiment, owing to the simple construction in which the edge portion 6012 of the first magnetic portion 601 has been bent toward the first coil 403, the effect of reducing the arrival amount of the leakage magnetic field from the first coil 403 which arrives at the imaging element 201 is enhanced. Owing to the simple construction in which the edge portion 6022 of the second magnetic portion 602 has been bent toward the second coil 503, the effect of reducing the arrival amount of the leakage magnetic field from the second coil 503 which arrives at the imaging element 201 is enhanced.

According to the present embodiment, even in the case where the imaging element 201 is sandwiched by the two coils 403 and 503, the arrival amount of the leakage magnetic field generated from each coil which arrives at the imaging element 201 can be further reduced. Therefore, even if the imaging element 201 executes the reading operation to read out the image signal, an influence of the magnetic field is further small and the inherent image signal can be further desirably read out, so that the occurrence of a disturbance of the image can be further suppressed.

Although the case where each of the edge portion 6012 of the first magnetic portion 601 and the edge portion 6022 of the second magnetic portion 602 was bent has been described above, it is not always necessary that both of the edge portions 6012 and 6022 have been bent. Any one of the edge portions 6012 and 6022 may be bent.

Third Embodiment

An imaging apparatus according to the third embodiment of the present invention will be described. Component elements similar to those in the foregoing first embodiment are designated by the same reference numerals and their description is omitted or simplified.

A fundamental construction of the imaging apparatus according to the present embodiment is substantially similar to that of the imaging apparatus according to the first embodiment. The imaging apparatus according to the present embodiment differs from the imaging apparatus according to the first embodiment with respect to a point that the imaging apparatus according to the present embodiment further includes a non-magnetic metal plate 900. The third embodiment will be described hereinafter with reference to FIG. 14 with respect to only a point different from the first embodiment.

Figure 14:
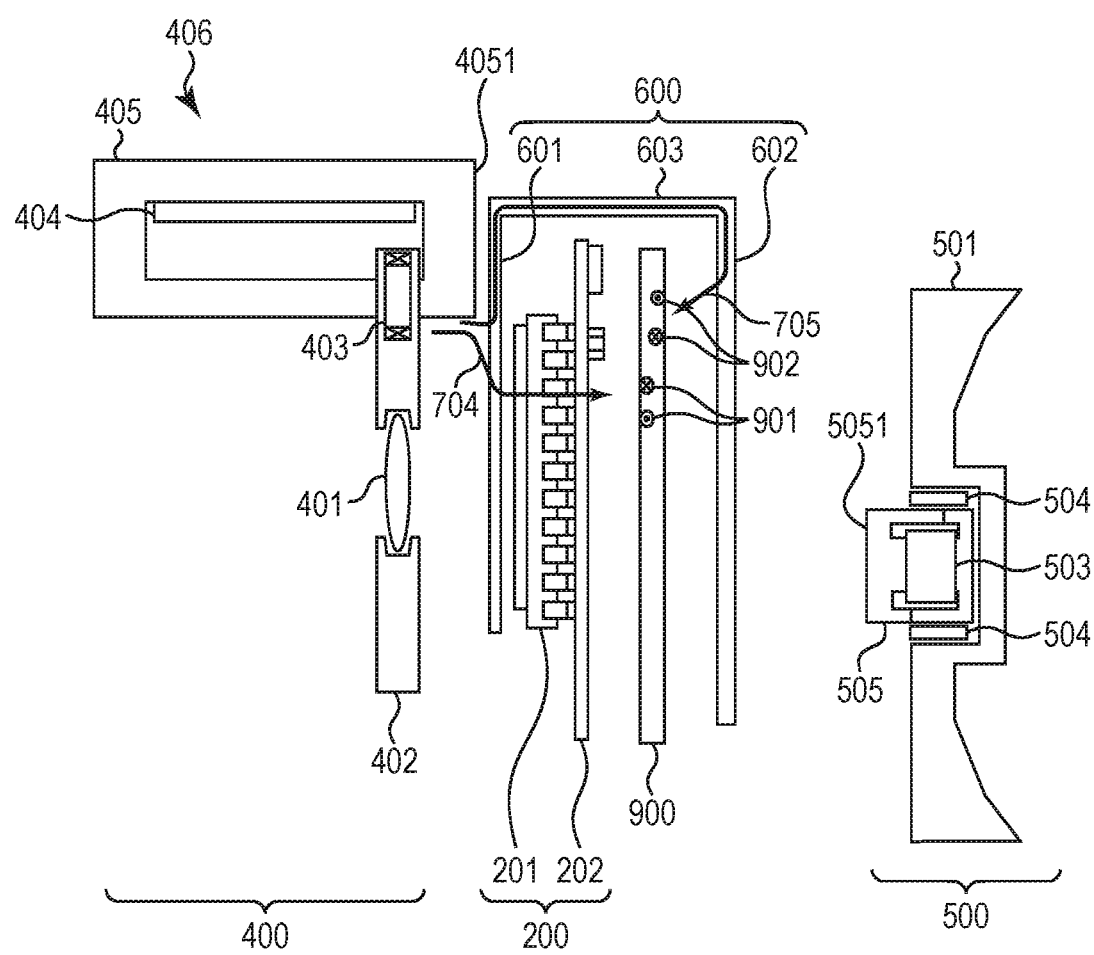
FIG. 14 is an explanatory diagram illustrating details of a main part of an imaging apparatus according to the third embodiment of the present invention.

As illustrated in FIG. 14, in the imaging apparatus according to the present embodiment, the non-magnetic metal plate 900 is provided between the second magnetic portion 602 and the imaging element 201. The metal plate 900 is arranged in parallel with the second magnetic portion 602.

The metal plate 900 has an area wider than that of a region where the imaging element 201 has been projected in the optical axis direction. A thickness of the metal plate 900 is larger than ⅛ of a skin depth at a driving frequency of the first coil 403 and is smaller than two times of the skin depth.

The action of the non-magnetic metal plate 900 will be described. A part of the leakage magnetic field which is generated from the first coil 403 penetrates the first magnetic portion 601. Therefore, a magnetic field 704 slightly arrives at the imaging element 201 by the leakage magnetic field from the first coil 403. This is because the magnetic field 704 is attracted to the second magnetic portion 602 arranged on the rear surface side of the imaging element 201. The magnetic field 704 contains, particularly, a component perpendicular to the light-receiving surface of the imaging element 201. The component (of the magnetic field 704) perpendicular to the light-receiving surface penetrates the imaging element 201 and enters the metal plate 900 arranged on the rear surface side of the imaging element 201. An eddy current 901 flows in the metal plate 900 in such a direction as to cancel the incident magnetic field 704. The eddy current 901 has such an effect that not only the magnetic field in the metal plate 900 is cancelled but also its peripheral magnetic field, that is, the magnetic field in the region of the imaging element 201 is cancelled. As for such an effect that the magnetic field is cancelled as mentioned above, if the thickness of the metal plate 900 is larger than ⅛ of the skin depth at the driving frequency of the first coil 403, that is, at the frequency of the magnetic field, such an effect is sufficiently large, and when it is equal to about two times of the skin depth, the effect is saturated.

By cancelling the magnetic field 704 by the metal plate 900 as mentioned above, the arrival amount of the magnetic field which arrives at the imaging element 201 can be further reduced.

Further, as a component of the leakage magnetic field from the first coil 403, there is also a magnetic field component 705 which is attracted to the first magnetic portion 601 and is propagated to the second magnetic portion 602 through the third magnetic portion 603. A leakage of the magnetic field component 705 which is propagated from the surface of the second magnetic portion 602 toward its outside exists slightly. Even to such a leakage of the magnetic field component 705, since the metal plate 900 is arranged between the second magnetic portion 602 and the imaging element 201, an eddy current 902 flows similarly in the metal plate 900 in such a direction as to cancel the magnetic field. Since the eddy current 902 flows in the metal plate 900, an arrival amount of the slight magnetic field component which leaks slightly from the surface of the second magnetic portion 602 and arrives at the imaging element 201 can be also reduced.

Although a material of the metal plate 900 is not particularly limited, a non-magnetic metal material in which a conductivity is high and a relative permeability is almost equal to 1 can be used, that is, a non-magnetic metal material such as non-magnetic stainless steel, copper, copper-based alloy, aluminum, aluminum-based alloy, or the like can be used. Specifically speaking, as a material of the metal plate 900, for example, copper whose conductivity is equal to about $5.7 \times 10^7$ [S/m], aluminum whose conductivity is equal to about $1.3 \times 10^7$ [S/m], or non-magnetic stainless steel whose conductivity is equal to about $1.0 \times 10^7$ [S/m] can be mentioned. The skin depth is inversely proportional to a square root of a product of the frequency, conductivity, and relative permeability. Therefore, particularly, if such materials having a high conductivity are used as a material of the metal plate 900, even when the metal plate 900 is thinner than a metal plate made of another material, a similar magnetic field cancelling effect is obtained. Thus, it is advantageous to realize a thin size of the apparatus.

The metal plate 900 can be arranged by thermally coupling with the imaging element 201 or the printed circuit board 202 on which the imaging element 201 has been mounted. A heat resistance of the metal plate 900 having a high conductivity is also low. Therefore, if the metal plate 900 having a high conductivity is thermally coupled with the imaging element 201 or the printed circuit board 202 and is arranged, such an additional effect that a heat radiating effect of the imaging element 201 is enhanced and a disturbance of the image by the heat is suppressed is also obtained. By closely arranging the metal plate 900 and the imaging element 201 or the printed circuit board 202, they can be thermally coupled. By connecting the metal plate 900 and the imaging element 201 or the printed circuit board 202 by using a heat transfer material, they can be also thermally coupled.

In the case of arranging the metal plate 900 as mentioned above, in order to assure a cooling effect by the cooling fan 500, a plurality of through-holes can be formed in the metal plate 900 and the second magnetic portion 602, respectively.

Figure 15:
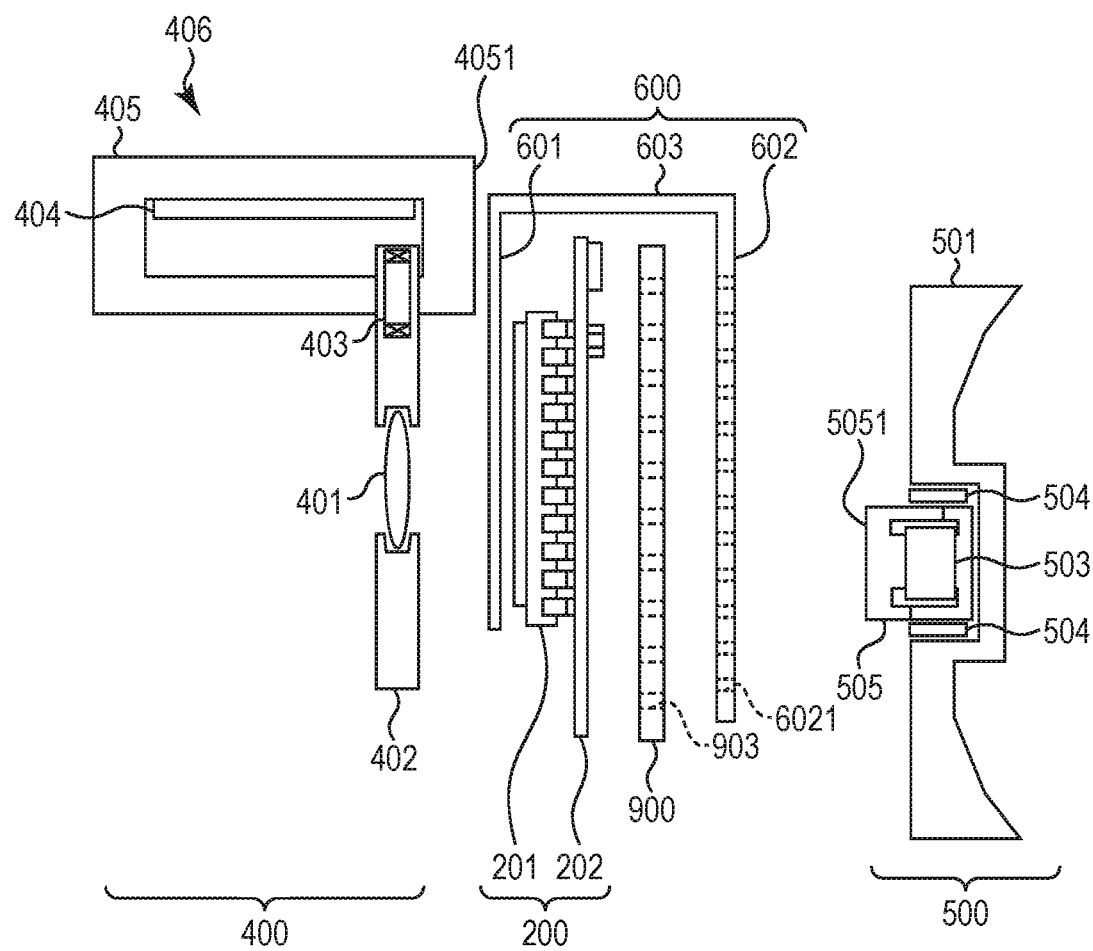
FIG. 15 is an explanatory diagram illustrating details of a main part of an imaging apparatus according to a modification of the third embodiment of the present invention.

In this case, as illustrated in FIG. 15, a plurality of through-holes 903 are formed in the metal plate 900. Each through-hole 903 is formed from a principal plane (of the metal plate 900) on the side of the imaging element 201 to a principal plane on the side of the cooling fan 500 so as to penetrate the metal plate 900. The plurality of through-holes 903 are arranged, for example, in a square lattice shape or a staggered lattice shape.

Figure 16:
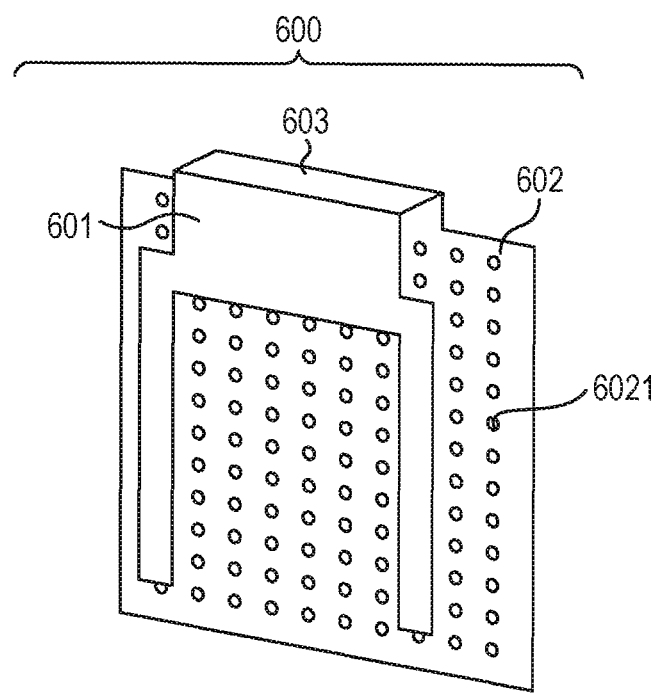
FIG. 16 is an explanatory diagram illustrating details of a magnetic member in the imaging apparatus according to the modification of the third embodiment of the present invention.

A plurality of through-holes 6021 are formed in the second magnetic portion 602. Each through-hole 6021 is formed from a principal plane (of the second magnetic portion 602) on the side of the imaging element 201 to the principal plane on the side of the cooling fan 500 so as to penetrate the second magnetic portion 602. The plurality of through-holes 6021 are arranged, for example, in a square lattice shape or a staggered lattice shape. FIG. 16 illustrates a case where the plurality of through-holes 6021 arranged in the square lattice shape are formed in the second magnetic portion 602.

As mentioned above, the plurality of through-holes 903 can be formed in the metal plate 900 and the plurality of through-holes 6021 can be formed in the second magnetic portion 602. In this case, the air can flow in the through-holes 903 and 6021, and the imaging element 201 and the printed circuit board 202 can be effectively cooled by a flow of the air formed by the cooling fan 500.

Also in the case of the first or second embodiment in which the metal plate 900 is not arranged, the plurality of through-holes 6021 may be formed in the second magnetic portion 602.

Although the case where the non-magnetic metal plate 900 is provided between the second magnetic portion 602 and the imaging element 201 has been described above, the non-magnetic metal plate may be provided between the first magnetic portion 601 and the imaging element 201.

Figure 17:
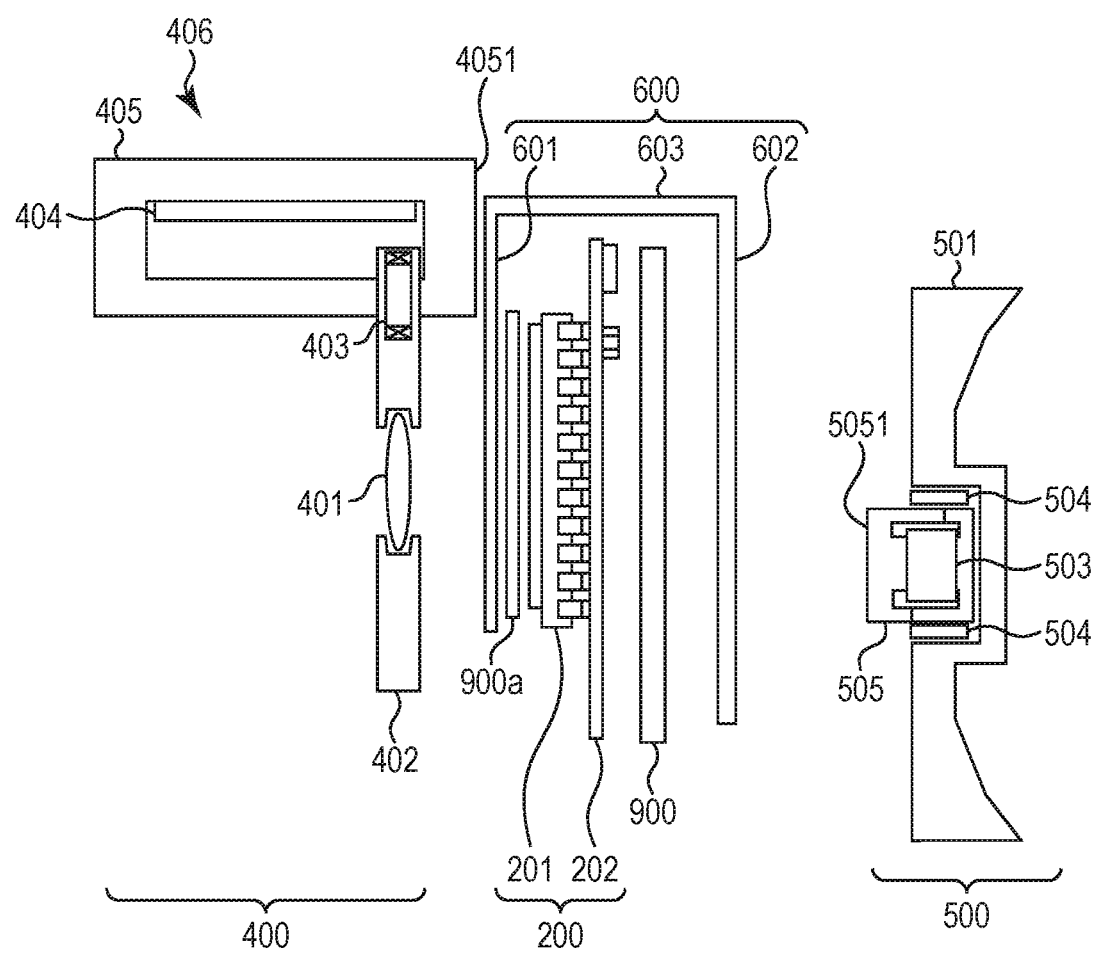
FIG. 17 is an explanatory diagram illustrating details of the main part of the imaging apparatus according to a modification of the third embodiment of the present invention.

In this case, as illustrated in FIG. 17, a non-magnetic metal plate 900a is provided between the first magnetic portion 601 and the imaging element 201. The metal plate 900a is arranged in parallel with the first magnetic portion 601. As a material of the metal plate 900a, a material similar to that of the foregoing metal plate 900 can be used.

An outer shape of the metal plate 900a is wider than the area of the imaging element 201. A thickness of the metal plate 900a is larger than ⅛ of a skin depth at a driving frequency of the second coil 503 and is smaller than two times of the skin depth.

An opening portion in which a pixel area of the imaging element 201 is exposed is formed in the metal plate 900a, so that light is transmitted into the pixel area of the imaging element 201. Even if the metal plate 900a has the opening portion, a predetermined magnetic field cancelling effect is obtained in a manner similar to the metal plate 900. In a manner similar to the case where the arrival amount of the leakage magnetic field from the first coil 403 which arrives at the imaging element 201 can be further reduced by the foregoing metal plate 900, the arrival amount of the leakage magnetic field from the second coil 503 which arrives at the imaging element 201 can be further reduced by the foregoing metal plate 900a.

It is not always necessary to provide both of the metal plates 900 and 900a. Any one of the metal plates 900 and 900a can be also provided.

According to the present embodiment, even in the case where the imaging element 201 is sandwiched by the two coils 403 and 503, the arrival amount of the leakage magnetic field generated from each coil which arrives at the imaging element 201 can be further reduced. Therefore, even if the imaging element 201 executes the reading operation to read out the image signal, an influence of the magnetic field is small and the inherent image signal can be further desirably read out, so that the occurrence of a disturbance of the image can be suppressed.

Although the case where the metal plates 900 and 900a are provided in the construction similar to that of the imaging apparatus according to the first embodiment has been described above, even in a construction similar to that of the imaging apparatus according to the second embodiment, the metal plates 900 and 900a can be similarly provided.

Fourth Embodiment

An imaging apparatus according to the fourth embodiment of the present invention will be described. Component elements similar to those in the foregoing first embodiment are designated by the same reference numerals and their description is omitted or simplified.

In the foregoing embodiments, the case where the first coil 403 in the voice coil motor 406 and the second coil 503 in the cooling fan 500 were arranged so as to sandwich the imaging element 201 has been described. However, it is not always necessary that the two coils 403 and 503 are arranged for the imaging element 201. Only one coil may be arranged. In the present embodiment, a case where the cooling fan 500 is not provided and the second coil 503 is not arranged for the imaging element 201 will be described with reference to FIG. 18.

Figure 18:
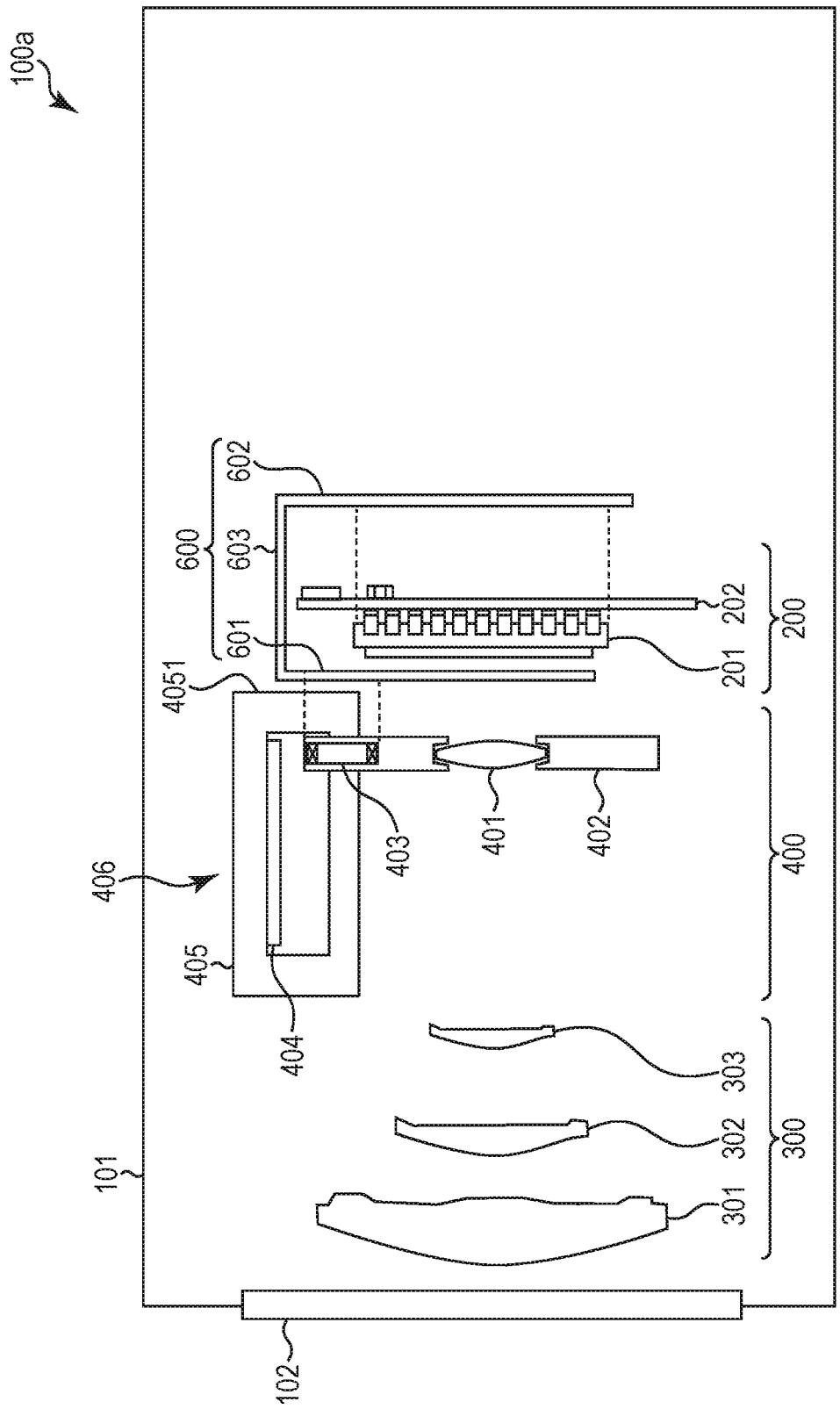
FIG. 18 is an explanatory diagram illustrating a schematic construction of an imaging apparatus according to the fourth embodiment of the present invention.

As illustrated in FIG. 18, unlike the imaging apparatus 100 according to the first embodiment, in an imaging apparatus 100a according to the present embodiment, the cooling fan 500 is not provided behind the imaging unit 200. For example, in the case where the heat generation of the heat generating portion such as an imaging element 201 or the like in the casing 101 is small and it is not always necessary to forcedly cool the heat generating portion, such a construction that the cooling fan 500 is not provided as mentioned above can be realized. If the imaging apparatus 100a is constructed as a digital still camera instead of a digital video camera, since an imaging time is very short, such a construction that the cooling fan 500 is not provided can be realized. A construction of the imaging apparatus 100a is similar to that of the imaging apparatus 100 according to the first embodiment except for a point that the cooling fan 500 is not provided.

Also in the imaging apparatus 100a according to the present embodiment, the sheet-like or plate-like magnetic member 600 is arranged in a manner similar to the imaging apparatus 100 according to the first embodiment. Therefore, also in the imaging apparatus 100a according to the present embodiment, the arrival amount of the leakage magnetic field generated from the first coil 403 which arrives at the imaging element 201 can be reduced by the sheet-like or plate-like magnetic member 600 as mentioned above.

Modified Embodiments

The present invention is not limited to the foregoing embodiments but many various modifications are possible and the present invention can be also applied to other constructions within a scope without departing from an essence of the present invention.

For example, although the embodiments have been described above with respect to the case where the imaging apparatus is the digital video camera, the imaging apparatus is not limited it. Besides the digital video camera, the imaging apparatus may be a digital still camera or may have both functions of the digital video camera and the digital still camera.

Although the embodiments have been described above with respect to the case where the coils 403 and 503 were respectively arranged on the front side and the rear side of the imaging element 201, the layout of the coils to the imaging element 201 is not limited to it. For example, also in a case where the coils 403 and 503 are respectively arranged on the upper side and the lower side of the imaging element 201 so as to sandwich the imaging element 201, the sheet-like or plate-like magnetic member 600 can be arranged in a manner similar to the foregoing embodiments.

Although the embodiments have been described above with respect to the case where the first magnetic portion 601 faces the magnetic yoke 405 and the second magnetic portion 602 faces the magnetic core 505, the present invention is not limited to such a case. It is sufficient that the first magnetic portion 601 faces the magnetic yoke 405 or the second magnetic portion 602 faces the magnetic core 505.

Although the embodiments have been described above with respect to the case where the coil in the voice coil motor 406 and the coil in the DC brushless motor which is used in the cooling fan 500 are used as a first coil 403 and a second coil 503 which are arranged so as to sandwich the imaging element 201. However, the first and second coils which are arranged so as to sandwich the imaging element 201 are not limited to those coils. For example, the first and second coils may be an inductor of an output filter unit of a switching power supply circuit, a coil in a DC brushless motor to drive a shutter, and the like, which are arranged near the imaging element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-131246, filed Jun. 30, 2015, which is hereby incorporated by reference herein in its entirety.

What is claimed is:

1. An imaging apparatus comprising:
a first magnetic core and a first coil wound around the first magnetic core;
a second magnetic core and a second coil wound around the second magnetic core;
an imaging element provided between the first coil and the second coil; and
a magnetic member,
wherein the magnetic member includes
a first magnetic portion arranged between the first coil and one surface serving as a light-receiving surface side of the imaging element,
a second magnetic portion arranged between the second coil and the other surface side opposite to the light-receiving surface side of the imaging element, and
a third magnetic portion which connects the first magnetic portion and the second magnetic portion, and
wherein the first magnetic portion is arranged so as to face the first magnetic core, and/or the second magnetic portion is arranged so as to face the second magnetic core.

2. An apparatus according to claim 1, wherein the second magnetic portion is arranged on the side of a rear surface side opposite to the light-receiving surface of the imaging element and has an area larger than an area of a region to which the imaging element has been projected.

3. An apparatus according to claim 1, wherein the first magnetic portion, the second magnetic portion, and the third magnetic portion are integratedly formed.

4. An apparatus according to claim 1, wherein the first magnetic core has a surface on the side of the first magnetic portion, a surface of an area ratio of 10% or more of the surface of the first magnetic core facing the first magnetic portion, and/or the second magnetic core has a surface on the side of the second magnetic portion, a surface of an area ratio of 10% or more of the surface of the second magnetic core facing the second magnetic portion.

5. An apparatus according to claim 1, wherein the first magnetic portion is arranged near the first magnetic core than the imaging element, and/or the second magnetic portion is arranged near the second magnetic core than the imaging element.

6. An apparatus according to claim 1, wherein the first magnetic portion has an edge portion bent to the side of the first coil, and/or the second magnetic portion has an edge portion bent to the side of the second coil.

7. An apparatus according to claim 1, further comprising a non-magnetic metal plate arranged between the imaging element and the first magnetic portion or the second magnetic portion, and
wherein a thickness of the metal plate is larger than $1/8$ of a skin depth at a driving frequency of the first coil or the second coil and is smaller than two times of the skin depth.

8. An imaging apparatus comprising:
a magnetic core and a coil wound around the magnetic core;
an imaging element; and
a magnetic member,
wherein the magnetic member includes
a first magnetic portion arranged between the coil and a side of one surface serving as a light-receiving surface side of the imaging element,
a second magnetic portion arranged on the side of the other surface opposite to the light-receiving surface side of the imaging element, and
a third magnetic portion which connects the first magnetic portion and the second magnetic portion, and
wherein the first magnetic portion faces the magnetic core.

9. An imaging apparatus comprising:
a lens barrel;
a lens group constructed by a plurality of lenses;
a driving unit configured to drive at least one of the plurality of lenses and including a first magnetic core and a first coil wound around the first magnetic core;
a cooling unit including a second magnetic core and a second coil wound around the second magnetic core;
an imaging element provided between the lens group and the cooling unit; and
a magnetic member,
wherein the magnetic member includes
a first magnetic portion arranged between the lens group and one surface serving as a light-receiving surface side of the imaging element,
a second magnetic portion arranged between the cooling unit and the other surface on the side opposite to the light-receiving surface side of the imaging element, and
a third magnetic portion which connects the first magnetic portion and the second magnetic portion, and
wherein the first magnetic portion faces the first magnetic core of the driving unit, and the second magnetic portion faces the second magnetic core of the cooling unit.

10. An imaging apparatus comprising:
a lens barrel;
a lens group constructed by a plurality of lenses;
a driving unit configured to drive at least one of the plurality of lenses and including a first magnetic core and a first coil wound around the first magnetic core,
an imaging element provided behind the lens group; and
a magnetic member,
wherein the magnetic member includes
a first magnetic portion arranged between the lens group and one surface serving as a light-receiving surface side of the imaging element,
a second magnetic portion arranged on the side of the other surface opposite to the light-receiving surface side of the imaging element, and
a third magnetic portion which connects the first magnetic portion and the second magnetic portion, and
wherein the first magnetic portion faces the first magnetic core of the driving unit.

* * * * *